US006820002B2

(12) United States Patent
Terada

(10) Patent No.: US 6,820,002 B2
(45) Date of Patent: Nov. 16, 2004

(54) MOVING DIRECTION DETECTION METHOD, MOVING DIRECTION DETECTION APPARATUS, AND PROGRAM CODE

(75) Inventor: Toshihito Terada, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/407,045

(22) Filed: Apr. 4, 2003

(65) Prior Publication Data

US 2003/0191582 A1 Oct. 9, 2003

(30) Foreign Application Priority Data

Apr. 8, 2002 (JP) ........................................ 2002-104804

(51) Int. Cl.[7] ............................................. G01C 21/26
(52) U.S. Cl. ........................ 701/207; 701/79; 701/110; 701/300; 342/357.01; 342/357.08
(58) Field of Search ............................. 701/23, 79, 110, 701/200, 201, 207, 210, 213, 214, 300; 342/357.01, 357.03, 357.08

(56) References Cited

U.S. PATENT DOCUMENTS 5,535,639 A * 7/1996 Ogata ...................... 73/514.16
5,583,776 A 12/1996 Levi et al.

* cited by examiner

Primary Examiner—Gertrude A. Jeanglaude
(74) Attorney, Agent, or Firm—Frishauf, Holtz, Goodman & Chick, P.C.

(57) ABSTRACT

A walking direction detection apparatus has an azimuth detection unit and acceleration detection unit. After a vertical direction with respect to the ground of an apparatus is corrected based on the detection direction of a gravitational acceleration component, a periodic up/down pattern of the absolute value of acceleration is detected. A value where the acceleration component in the horizontal direction becomes maximal or minimal is detected at a predetermined timing at which the acceleration component in the vertical direction transits from a maximal value to minimal value. The direction of the apparatus is corrected based on the direction of the acceleration component in the horizontal direction of that value. Based on these correction results, the walking direction of the movable body is detected.

15 Claims, 18 Drawing Sheets

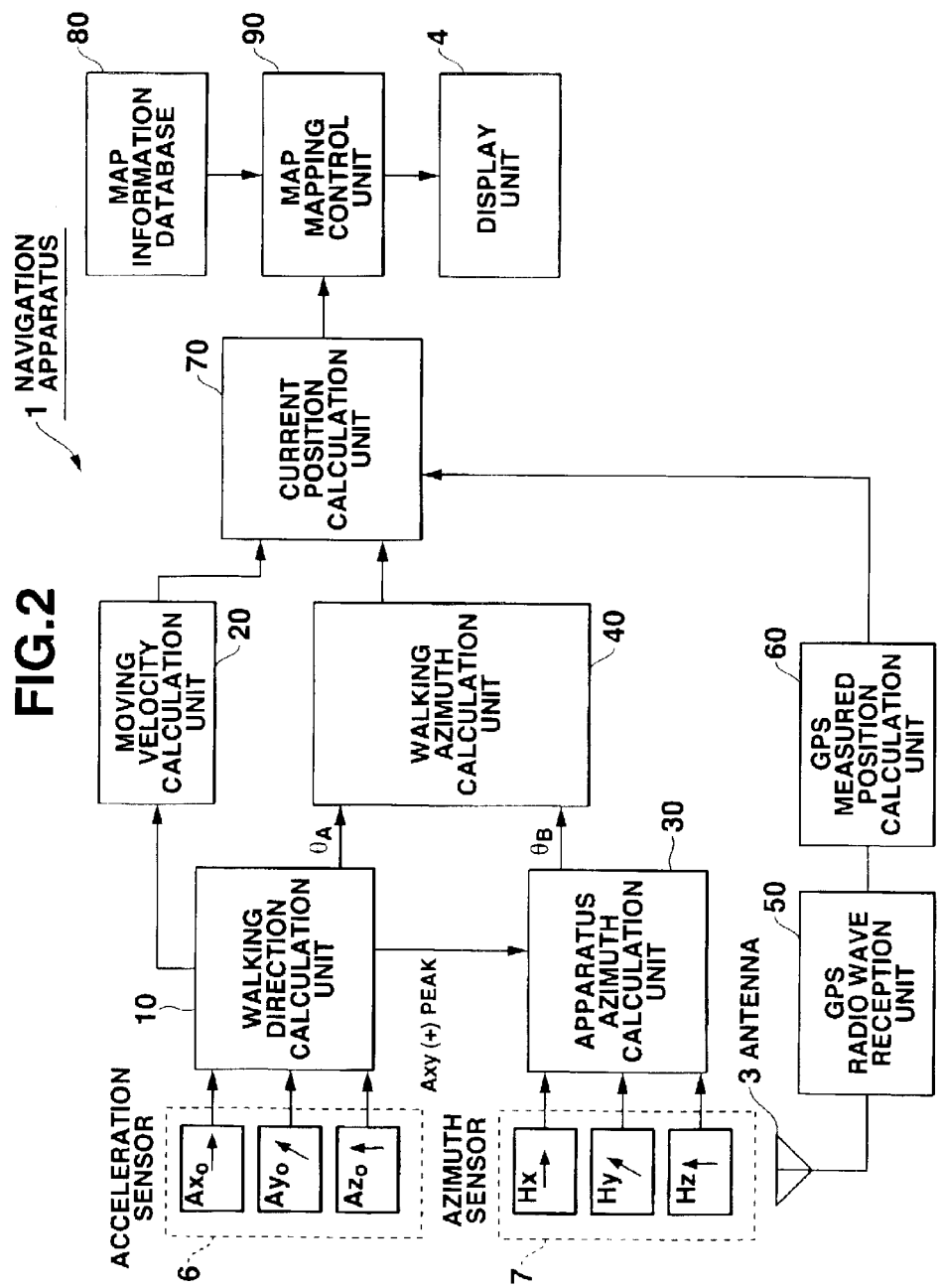

MOVING DIRECTION DETECTION METHOD, MOVING DIRECTION DETECTION APPARATUS, AND PROGRAM CODE

CROSS-REFERENCE TO RELATED APPLICATIONS

This application is based upon and claims the benefit of priority from the prior Japanese Patent Application No. 2002-104804, filed on Apr. 8, 2002, the entire contents of which are incorporated herein by reference.

BACKGROUND OF THE INVENTION

1. Field of the Invention

The present invention relates to an apparatus and method for detecting the moving direction of a movable body such as a person or the like, and a program.

2. Description of the Related Art

For example, a navigation apparatus, which acquires the current position of a transport apparatus such as an automobile or the like, displays that current position on a map, and gives a route guidance from the current position to a destination on the map, uses GPS (Global Positioning System) to acquire the current position. In order to cope with a case wherein such an apparatus cannot receive a radio signal from an artificial satellite which is required for that apparatus to measure its position, e.g., a case wherein the transport apparatus is traveling through a tunnel or an urban area with many high-rise buildings, the apparatus comprises a velocity sensor used to detect the moving velocity of the transport apparatus, and a gyro sensor used to detect the moving direction of the movable body, and performs inertial navigation using information detected by these sensors, thus allowing navigation in such a place.

On the other hand, a measurement device that uses GPS has undergone size and weight reductions, and a navigation apparatus that a person can carry is commercially available.

When the navigation apparatus is set in a transport apparatus such as an automobile, the relationship between the travel direction of the transport apparatus and the direction of the navigation apparatus is basically specified in advance. However, when a person carries the navigation apparatus, how that person holds the apparatus is unknown. For this reason, it is difficult to estimate the travel direction of a walking carrier with reference to the direction of the navigation apparatus.

BRIEF SUMMARY OF THE INVENTION

According to one aspect of the present invention, there is provided a moving direction detection apparatus which can be carried by a movable body, and comprises an acceleration detection unit which detects acceleration component of the movable body, a first correction unit which corrects a carrying direction of the moving direction detection apparatus with respect to the vertical direction based on the direction of the acceleration component detected by the acceleration detection unit, a second correction unit which corrects the carrying direction of the moving direction detection apparatus with respect to the horizontal direction based on a periodic up/down pattern of an absolute value of the acceleration component of the movable body which is detected by the acceleration detection unit, and a moving direction detection unit which detects a moving direction of the movable body in accordance with correction results of the first and second correction units.

According to one aspect of the present invention, there is provided a moving direction detection method for detecting a moving direction of a movable body, comprising an acceleration component acquisition step of acquiring information of an acceleration component in a vertical direction and an acceleration component in a horizontal direction in association with an acceleration of the movable body, which is produced upon motion of the movable body, at a predetermined time interval, a vertical acceleration extreme detection step of detecting a maximal value where a change over time in absolute value of the acceleration component in the vertical direction, acquired in the acceleration component acquisition step, turns from up to down, and a minimal value where a change over time in absolute value of the acceleration component in the vertical direction turns from down to up, a horizontal acceleration extreme detection step of detecting a maximal value where a change in absolute value of the acceleration component in the horizontal direction turns from up to down within a time period between detection times of the maximal and minimal values of the absolute value of the acceleration component in the vertical direction in the vertical direction extreme detection step, a horizontal acceleration direction detection step of detecting a direction of the acceleration component in the horizontal direction at a detection time of the maximal value of the absolute value of the acceleration component detected in the horizontal direction in the horizontal acceleration extreme detection step, and a moving direction detection step of detecting a moving direction of the movable body based on the direction of the acceleration component in the horizontal direction detected in the horizontal acceleration direction detection step.

BRIEF DESCRIPTION OF THE SEVERAL VIEWS OF THE DRAWING

FIG. 2 is a block diagram showing the circuit arrangement of the navigation apparatus according to the first embodiment of the present invention;

DETAILED DESCRIPTION OF THE INVENTION

Preferred embodiments of the present invention will be described hereinafter with reference to the accompanying drawings. Note that this embodiment will explain a case wherein the present invention is applied to a navigation apparatus that a movable body such as a person or the like can carry.

Note that "azimuth" in this embodiment means a direction with reference to the meridian of the Earth.

Figure 1A:
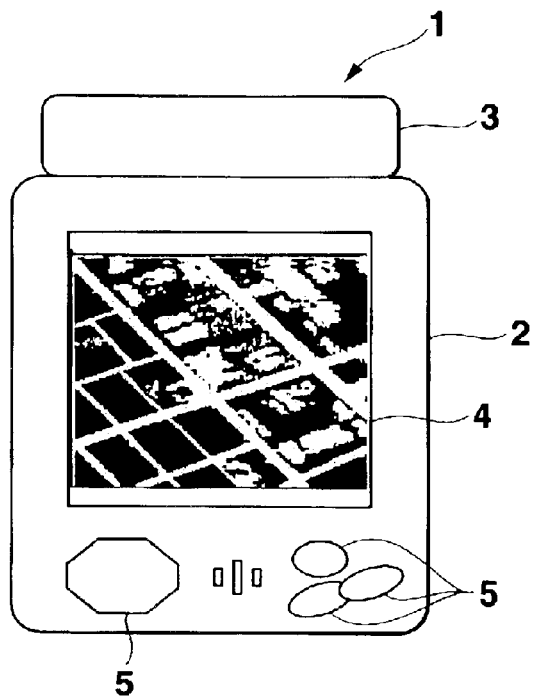
FIG. 1A is a view showing the structure of the outer appearance of a navigation apparatus according to the first embodiment of the present invention.

FIG. 1A is a view showing the structure of the outer appearance of a navigation apparatus 1 according to the first embodiment of the present invention.

Figure 1B:
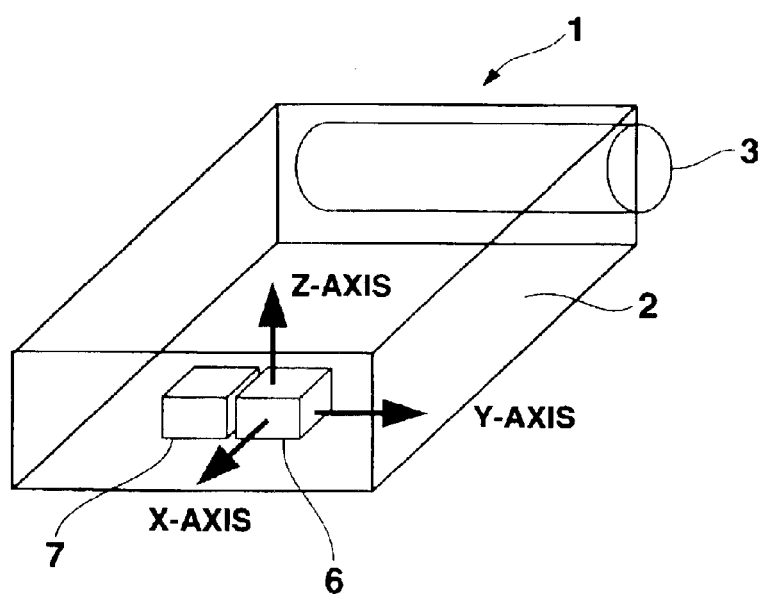
FIG. 1B is a schematic view showing the internal structure of the navigation apparatus according to the first embodiment of the present invention.

FIG. 1B is a schematic view showing the internal structure of the navigation apparatus 1 according to the first embodiment of the present invention.

As shown in FIG. 1A, the navigation apparatus 1 roughly comprises a main body 2 and antenna 3. A display unit 4 and operation buttons 5 are arranged on the upper surface portion of the main body 2. The display unit 4 displays a map around the current position of the navigation apparatus 1. The operation buttons 5 are operated by a carrier of the navigation apparatus 1. The carrier means a pedestrian who carries the navigation apparatus 1. The antenna 3 receives a radio signal. The radio signal to be received by the antenna 3 is that transmitted from an artificial satellite for GPS.

As shown in FIG. 1B, an acceleration sensor 6 and azimuth sensor 7 are arranged inside the main body 2. The acceleration sensor 6 detects components in X-, Y-, and Z-axis directions shown in FIG. 1B (X-, Y-, and Z-components) of an acceleration of a force acting on the navigation apparatus 1. The azimuth sensor 7 detects the current azimuth of the navigation apparatus 1 based on geomagnetism. Detection of the current azimuth of the navigation apparatus 1 is implemented by using a geomagnetism sensor as the azimuth sensor 7.

FIG. 2 will be explained below. FIG. 2 shows the circuit arrangement of the navigation apparatus 1 according to the first embodiment of the present invention. The same reference numerals in FIG. 2 denote the same components as those shown in FIG. 1, and a description thereof will be omitted.

A walking direction calculation unit 10 in FIG. 2 calculates the walking direction in walking motion of the carrier of the navigation apparatus 1 with reference to the azimuth of the navigation apparatus 1 in accordance with the X-, Y-, and Z-acceleration components detected by the acceleration sensor 6. The detailed arrangement of the walking direction calculation unit 10 will be explained later.

A moving velocity calculation unit 20 calculates the walking velocity of the carrier by calculating the walking pitch of the carrier, i.e., the number of steps per unit time, in accordance with the X-, Y-, and Z-acceleration components detected by the acceleration sensor 6.

An apparatus azimuth calculation unit 30 calculates the current azimuth of the navigation apparatus 1 in accordance with the value detected by the azimuth sensor 7.

A walking azimuth calculation unit 40 calculates the walking azimuth of the carrier in accordance with the walking direction of the carrier calculated by the walking direction calculation unit 10, and the azimuth of the navigation apparatus 1 calculated by the apparatus azimuth calculation unit 30.

A GPS radio signal reception unit 50 demodulates a radio signal, which is transmitted from the artificial satellite for GPS and is received by the antenna 3, in accordance with a predetermined interval, and acquires a signal including information required to measure the current position of the navigation apparatus 1 based on the demodulated radio signal.

A GPS measured position calculation unit 60 calculates the current position of the navigation apparatus 1 based on the information included in the signal acquired by the GPS radio signal reception unit 50. Note that the current position calculated by the GPS measured position calculation unit 60 will be referred to as a "GPS measured position" hereinafter.

A current position calculation unit 70 calculates the current position of the navigation apparatus 1 based on the latest GPS measured position calculated by the GPS measured position calculation unit 60, the walking azimuth from the GPS measured position, which is calculated by the walking azimuth calculation unit 40, and the walking velocity from the GPS measured position, which is calculated by the moving velocity calculation unit 20.

A map information database 80 pre-stores map information that expresses a map to be displayed on the display unit 4.

A map mapping control unit 90 extracts map information data, which includes the current position of the navigation apparatus 1 calculated by the current position calculation unit 70, from the map information database 80, and controls the display unit 4 to display a map expressed by the extracted map information data. Also, the unit 90 controls to superimpose the current position of the navigation apparatus 1 calculated by the current position calculation unit 70 on the displayed map.

The navigation apparatus 1 has the aforementioned arrangement.

Note that the walking direction calculation unit 10, moving velocity calculation unit 20, apparatus azimuth calculation unit 30, walking azimuth calculation unit 40, and current position calculation unit 70 of the arrangement of the navigation apparatus 1 shown in FIG. 2 can be implemented by a computer having a standard configuration. A computer having a standard configuration comprises a CPU, a storage unit which is used as a storage area of a control program that makes the CPU control respective building components, a work area, or a storage area of various data, an input unit for acquiring various data corresponding to operations by the carrier of the navigation apparatus 1, an output unit which notifies the carrier of various data by displaying them on, e.g., a display, and an interface (I/F).

The CPU controls respective building components by executing the control program. The storage unit comprises a ROM, RAM, and magnetic storage device. The work area is used when the CPU executes the control program. The interface provides an interface function required to connect the navigation apparatus 1 to a network.

On the other hand, the antenna 3, GPS radio signal reception unit 50, GPS measured position calculation unit 60, map information database 80, map mapping control unit 90, and display unit 4 are building components of an existing positioning device using GPS. That is, the navigation apparatus 1 can also be formed by combining such positioning device and the aforementioned standard computer, and further combining the acceleration sensor 6 and azimuth sensor 7.

The walking direction calculation unit 10 will be explained below.

The walking direction calculation unit 10 calculates the travel direction of walking motion of the carrier based on the X-, Y-, and Z-acceleration components detected by the acceleration sensor 6. Note that the travel direction of walking motion of the carrier means the walking direction of the carrier. A principle of calculating this walking direction will be described below.

In walking motion, back and forth oscillations are present in the walking direction of a pedestrian. The back and forth oscillations will be explained below with reference to FIGS. 3A and 3B.

Figure 3A:
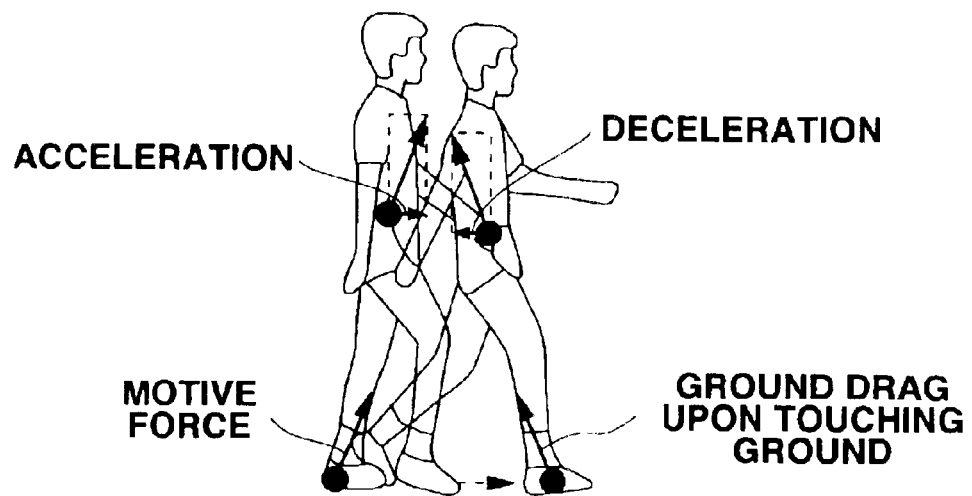
FIG. 3A is a profile view of back and forth oscillations in walking motion of a pedestrian.

FIG. 3A is a profile view of back and forth oscillations in walking motion of a pedestrian.

As shown in FIG. 3A, upon taking one step in the cycle of walking motion of the pedestrian, when the back-side foot in the travel direction of the pedestrian kicks the ground, a forward, obliquely upward motive force is produced with respect to the travel direction of the pedestrian. When this motive force is decomposed into vertical and horizontal components with respect to the ground, a horizontal component is used to accelerate the pedestrian in the travel direction.

After that, the foot that kicked the ground moves to a position in front of the other foot, and touches the ground. When the foot that kicked the ground touches the ground, a backward, obliquely upward ground drag is produced with respect to the travel direction. When this ground drag is decomposed into vertical and horizontal components with respect to the ground, a horizontal component is used to accelerate the pedestrian in a direction exactly opposite to the travel direction, i.e., to decelerate the pedestrian with respect to the travel direction.

Figure 3B:
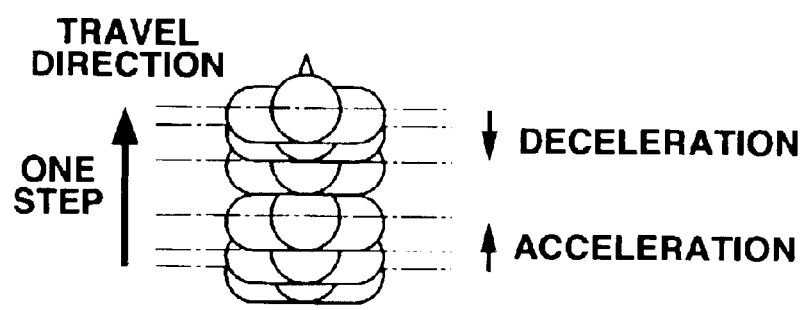
FIG. 3B is an aerial view of back and forth oscillations in walking motion of a pedestrian.

FIG. 3B will be described below. FIG. 3B shows the positions of an upper body during walking motion at one step of a pedestrian at given time intervals. In FIG. 3B, a time period in which the pedestrian is decelerated in the walking direction corresponds to that from when the back-side foot kicks the ground until that foot which kicked the ground passes by the other foot. Also, a time period in which the pedestrian is accelerated in the walking direction corresponds to that from when the foot which kicked the ground passes by the other foot until that foot which kicked the ground touches the ground.

The relationship between the acceleration in the vertical direction (a direction perpendicular to the ground) and that in the horizontal direction (a direction perpendicular to the vertical direction) in walking motion of a pedestrian will be explained below.

Figure 4:
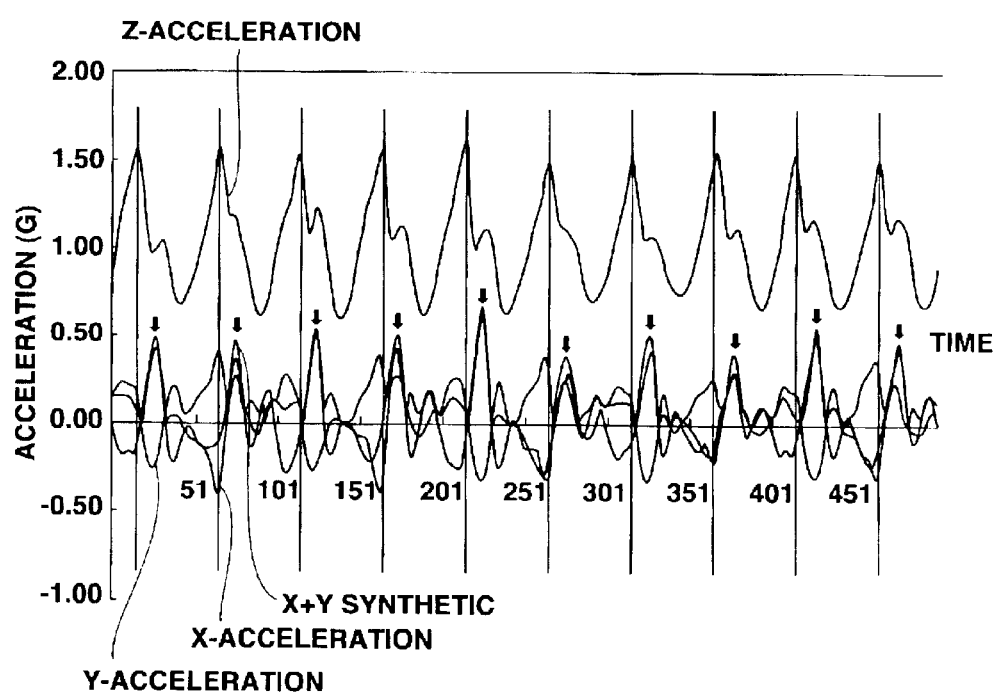
FIG. 4 is a graph showing the results of experiments designed to obtain the relationship between horizontal and vertical accelerations in walking motion of a carrier of the navigation apparatus shown in FIGS. 1A and 1B.
Figure 5:
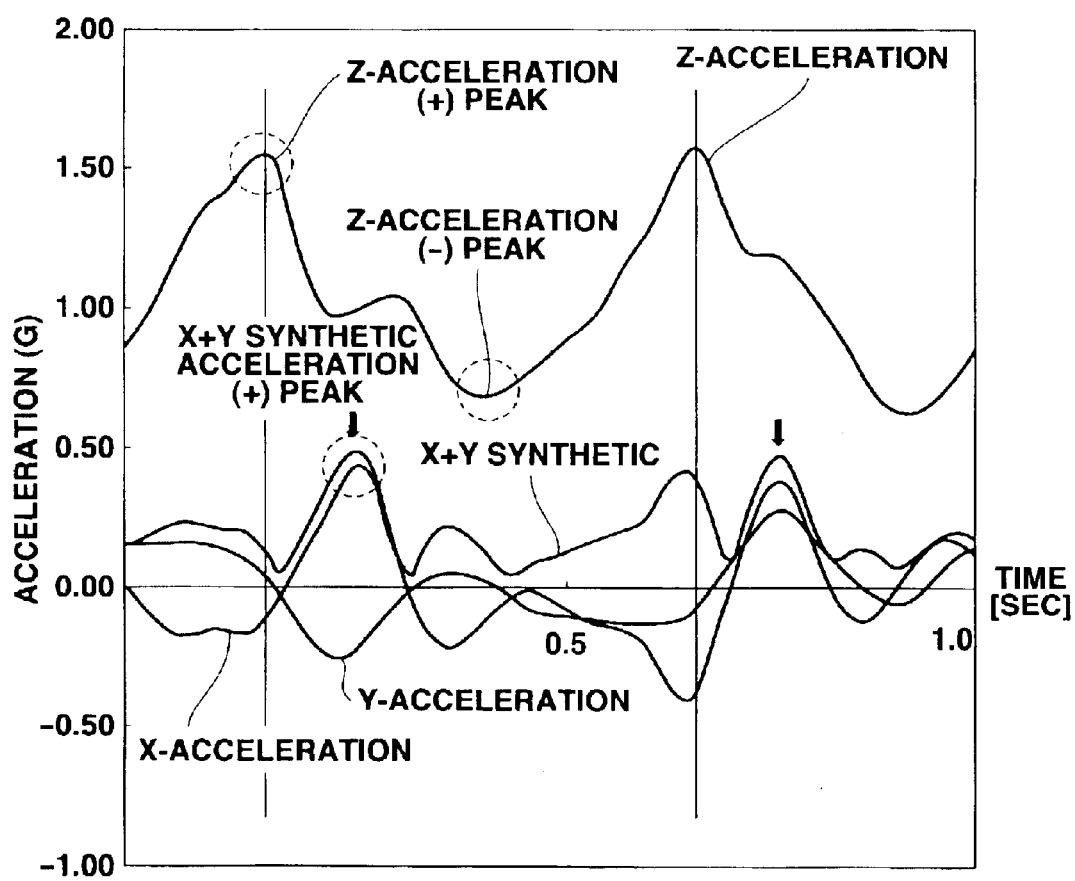
FIG. 5 is a graph showing the results of experiments designed to obtain the relationship between horizontal and vertical accelerations in walking motion of a carrier of the navigation apparatus shown in FIGS. 1A and 1B.

FIGS. 4 and 5 will be explained. The graphs of FIGS. 4 and 5 show the results of experiments which were designed to obtain the relationship between the acceleration in the horizontal direction and that in the vertical direction in walking motion of a pedestrian. The graphs shown in FIGS. 4 and 5 are obtained by plotting changes over time in X-, Y-, and Z-acceleration components detected by the acceleration sensor 6, which is put in, e.g., the breast pocket of a jacket of a subject, during walking motion of a pedestrian as the subject. Note that FIG. 5 is a graph showing the time axis as the abscissa of the graph shown in FIG. 4 in an enlarged scale.

In the experiments, the acceleration sensor 6 is set so that the Z-axis direction of the acceleration sensor 6 points to the direction perpendicular to the ground. Hence, an acceleration in the horizontal direction with respect to the ground is obtained by synthesizing X- and Y-acceleration components detected by the acceleration sensor 6.

In each of FIGS. 4 and 5, an upper graph shows the measurement result of a change over time in acceleration in the Z-axis direction shown in FIG. 1B, i.e., in a direction perpendicular to the ground. When the subject is not in motion, the value of an acceleration in the vertical direction is 1.00 [G]. 1.00 [G] corresponds to the gravitational acceleration. Hence, when the value of the acceleration in the vertical direction is larger than 1.00 [G], this means that an upward movement is accelerating or a downward movement is decelerating in walking motion of the pedestrian. On the other hand, when the value of the acceleration in the vertical direction is smaller than 1.00 [G], this means that a downward movement is accelerating or an upward movement is decelerating in walking motion of the pedestrian.

In the following description, an acceleration in the Z-axis direction, i.e., an acceleration in the vertical direction (a direction perpendicular to the ground) produced by walking motion will be referred to as a "vertical acceleration."

The upward and downward movements of the upper body of a pedestrian during walking motion of the pedestrian will be examined below while applying them to the patterns of the vertical acceleration graphs shown in FIGS. 4 and 5. In each graph, a top peak, i.e., a portion where a change over time in vertical acceleration turns from up into down appears at the time when the vertical moving direction of the upper body of the pedestrian changed from downward to upward by the aforementioned vertical component of the ground drag produced when the foot that kicked the ground of the pedestrian passes by the other foot and then touches the ground. On the other hand, a bottom peak in each graph, i.e., a portion where a portion where a change over time in vertical acceleration turns from down into up appears at the time when the vertical moving direction of the upper body of the pedestrian changes from upward to downward since the foot that kicked the ground of the pedestrian passes by the other foot.

Also, in the vertical acceleration graph, the time intervals of the top peaks, and those of the bottom peaks are nearly constant. As can be seen from the above description, these intervals indicate a time period required for walking motion for one step of the pedestrian, i.e., the walking pitch.

On the other hand, in each of FIGS. 4 and 5, lower graphs include a graph showing an acceleration in the X-axis direction, a graph showing an acceleration in the Y-axis direction shown in FIG. 1B, and a graph showing an acceleration obtained by synthesizing X- and Y-acceleration components. As described above, this synthesized acceleration represents an acceleration in the horizontal direction (a direction perpendicular to the vertical direction) with respect to the ground in walking motion of the pedestrian.

In the following description, an acceleration obtained by synthesizing X- and Y-acceleration components will be referred to as a "synthetic acceleration."

As shown in, especially, FIG. 5 of FIGS. 4 and 5, each top peak in the synthetic acceleration graph appears in the time interval between the times of the top and bottom peaks of the vertical acceleration. The top peak in the synthetic acceleration graph appears a delay of a given period, i.e., a period around ¼ to ⅕ of the walking pitch behind the top peak in the vertical acceleration graph. In consideration of the back and forth oscillations in the travel direction in walking motion of the pedestrian, which have been explained using FIGS. 3A and 3B, the top peak in the synthetic acceleration graph appears during the time interval after the back-side foot of the pedestrian kicks the ground until the back-side foot passes by the other foot. That is, this top peak corresponds to an acceleration that decelerates the movement of the pedestrian in the travel direction, i.e., an acceleration in a direction opposite to the travel direction in walking motion of the pedestrian.

Hence, the walking direction calculation unit 10 detects a value corresponding to the top peak of the vertical acceleration shown in the graphs of FIGS. 4 and 5 in accordance with acceleration components measured by the acceleration sensor 6. Then, the walking direction calculation unit 10 detects a value corresponding to the top peak in the synthetic acceleration graph shown in FIGS. 4 and 5. The walking direction calculation unit 10 calculates a direction to which this synthetic acceleration points at the time of the top peak of the synthetic acceleration. The calculated direction is a direction in a plane parallel to the ground. Finally, the walking direction calculation unit 10 calculates a direction exactly opposite to the calculated direction as the walking direction of the pedestrian.

In this manner, since the walking direction of the pedestrian is calculated based on the direction of a peak synthetic acceleration in a plane parallel to the ground, the walking direction of the pedestrian can be calculated irrespective of the holding state of the navigation apparatus 1, as long as a direction perpendicular to the ground (vertical direction) can be detected.

Figure 6:
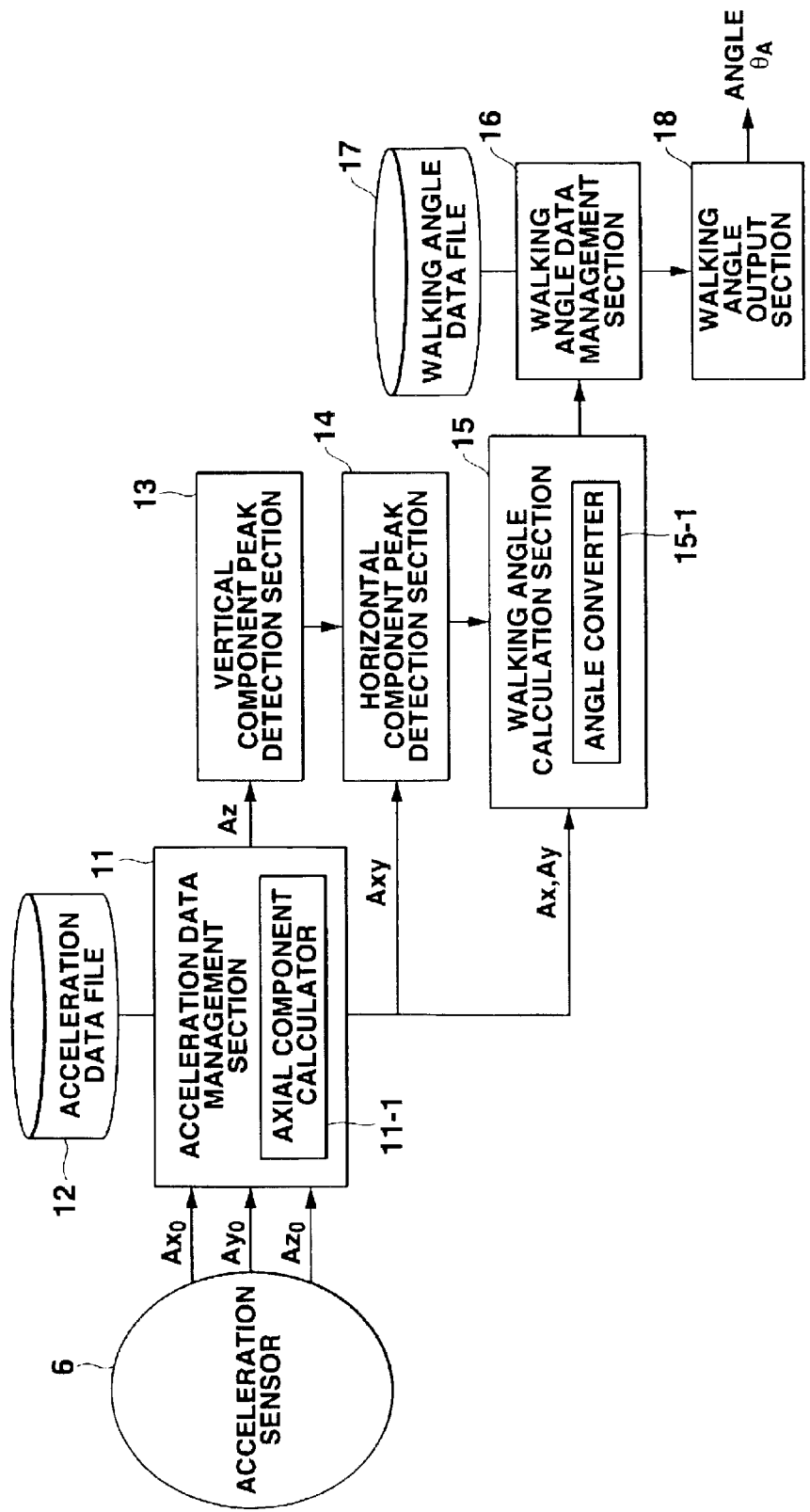
FIG. 6 is a block diagram showing the detailed arrangement of a walking direction calculation unit shown in FIG. 2.

FIG. 6 will be described below. FIG. 6 shows the detailed arrangement of the walking direction calculation unit 10 shown in FIG. 2. The walking direction calculation unit 10 calculates the walking direction of a carrier based on the aforementioned principle in accordance with the detection values of X-, Y-, and Z-acceleration components by the acceleration sensor 6.

An acceleration data management section 11 has an axial component calculator 11-1.

The axial component calculator 11-1 calculates, in advance, the vertical direction in the acceleration sensor 6, i.e., a direction perpendicular to the ground, based on X-, Y-, and Z-acceleration component values detected by the acceleration sensor 6 while the navigation apparatus 1 stands still. After that, based on X-, Y-, and Z-acceleration components $Ax_0$, $Ay_0$, and $Az_0$ detected by the acceleration sensor 6 while the carrier carries the navigation apparatus 1, the axial component calculator 11-1 calculates acceleration $\underline{A}$ obtained by synthesizing these acceleration components $Ax_0$, $Ay_0$, and $Az_0$, and a direction of acceleration $\underline{A}$. The axial component calculator 11-1 calculates an angular difference between the direction of acceleration $\underline{A}$, and the previously calculated vertical direction in the acceleration sensor 6. Then, the calculator 11-1 calculates a component Az of acceleration $\underline{A}$ in a direction perpendicular to the ground, and orthogonal components Ax and Ay as components obtained by dividing acceleration $\underline{A}$ in the X- and Y-axis directions on the plane parallel to the ground.

The axial component calculator 11-1 preferably detects the vertical direction based on the gravitational acceleration while the navigation apparatus 1 stands still, since the detection precision can be improved. However, when the wearing position of the navigation apparatus 1 with respect to the carrier has deviated during movement of the carrier, or when the carrier carries the navigation apparatus 1 by holding it in the hand, the wearing direction must be corrected by periodically detecting the vertical direction of the acceleration sensor 6. Accelerations produced by movement are oscillations, and their average yields "0." However, accelerations due to gravity are produced in a given direction, and their average yields a gravitational acceleration "G." Hence, when the axial component calculator 11-1 averages accelerations detected by the acceleration sensor 6, the gravitational acceleration alone can be extracted.

The directions indicated by acceleration components $Ax_0$, $Ay_0$, and $Az_0$ directly input from the acceleration sensor 6 to the acceleration data management section 11 correspond to those relative to the acceleration sensor 6. However, the directions indicated by acceleration components Ax, Ay, and Az after the vertical direction is corrected by the axial component calculator 11-1 correspond to those relative to the ground. Assume that acceleration components that the walking direction calculation unit 10 uses in the following description are Ax, Ay, and Az as those after correction. In the following description, a description of a process that pertains to correction of acceleration components will be omitted for the sake of simplicity, and the acceleration sensor 6 is assumed to directly output information of acceleration components Ax, Ay, and Az.

As a practical method of transforming a coordinate system from $Ax_0$, $Ay_0$, and $Az_0$ into Ax, Ay, and Az, since a coordinate transformation process as a general mathematical scheme can be used, a detailed description thereof will be omitted.

The acceleration data management section 11 manages an acceleration data file 12 by sequentially storing the absolute values of acceleration components Ax, Ay, and Ax detected upon carrying the navigation apparatus 1, which are calculated by the axial component calculator 11-1, and the absolute value of acceleration component Axy obtained by synthesizing Ax and Ay in the acceleration data file 12.

Figure 7:
FIG. 7 shows the configuration of an acceleration data file shown in FIG. 6.

FIG. 7 shows the configuration of the acceleration data file 12. As shown in FIG. 7, each record (field) of the acceleration data file 12 stores the absolute values of acceleration components Ax, Ay, Az, and Axy. In the acceleration data file 12, every time the acceleration data management section 11 acquires the absolute values of acceleration components Ax, Ay, Az, and Axy at a given time interval, these absolute values are stored in correspondence with record numbers 0 to N used to specify respective records.

Note that M, K1, and K2 shown in FIG. 7 will be explained later.

A vertical component peak detection section 13 detects the absolute value at a top peak of a curve, which expresses a change over time in vertical acceleration component Az as a graph, from those of vertical acceleration components Az stored in the acceleration data file 12.

A horizontal component peak detection section 14 detects, based on the absolute value at the top peak of vertical acceleration component Az detected by the vertical component peak detection section 13, the absolute value at a top peak in a curve, which expresses a change over time in synthetic acceleration component Axy, from data indicating the absolute values of synthetic acceleration components Axy stored in the acceleration data file 12.

When synthetic acceleration component Axy is located at the top peak of the curve that expresses a change over time in synthetic acceleration component Axy as a graph, a walking angle calculation section 15 calculates the direction of acceleration component Axy at the peak based on acceleration components Ax and Ay at that peak. Since the direction of acceleration component Axy corresponds to a deceleration direction with respect to the travel direction of the carrier shown in FIGS. 3A and 3B, the value of an angle indicating this direction is reversed by 180° by an angle converter 15-1. The walking angle calculation section 15 outputs, to a walking angle data management section 16, the value of the reversed angle as a walking angle, i.e., a calculation result of an angle indicating the travel direction in walking motion of the carrier.

The walking angle data management section 16 manages a walking angle data file 17 by sequentially storing data of walking angles output from the walking angle calculation section 15 in the walking angle data file 17.

Figure 8:
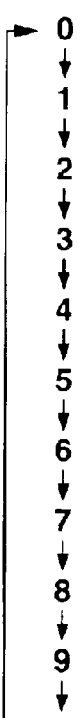
FIG. 8A shows the configuration of a walking angle data file shown in FIG. 6.
FIG. 8B shows the configuration of a walking angle data file shown in FIG. 6.

The configuration of the walking angle data file 17 will be described below with reference to FIGS. 8A and 8B. As shown in FIG. 8A, "szMax+1" data storage fields are assured in the walking angle data file 17. In this embodiment, "szMax+1"="10," as shown in FIG. 8A. That is, in the walking angle data file 17, angle data θ1 is stored in a field corresponding to index number "0," and angle data θ2 to θ10 are stored in fields corresponding to index numbers in unitary increments up to "szMax+1," i.e., "10." Note that the walking angle data file 17 is used as a so-called ring buffer by a process to be described later. Therefore, when walking angle data more than "szMax+1" are stored in the walking angle data file 17, the latest walking angle data is overwritten in the field that stores the oldest walking angle data. In this case, walking angle data more than "szMax+1" correspond to θ11 and θ12 shown in FIG. 8B.

A walking angle output section 18 calculates an angle as the average of the sum of walking angle data stored in the walking angle data file 17, and outputs angle $\theta_A$ as this calculation result as the final calculation result of the walking direction.

The walking direction calculation unit 10 has the aforementioned arrangement.

The sequence of processes executed by this walking direction calculation unit 10 will be described below.

Figure 9:
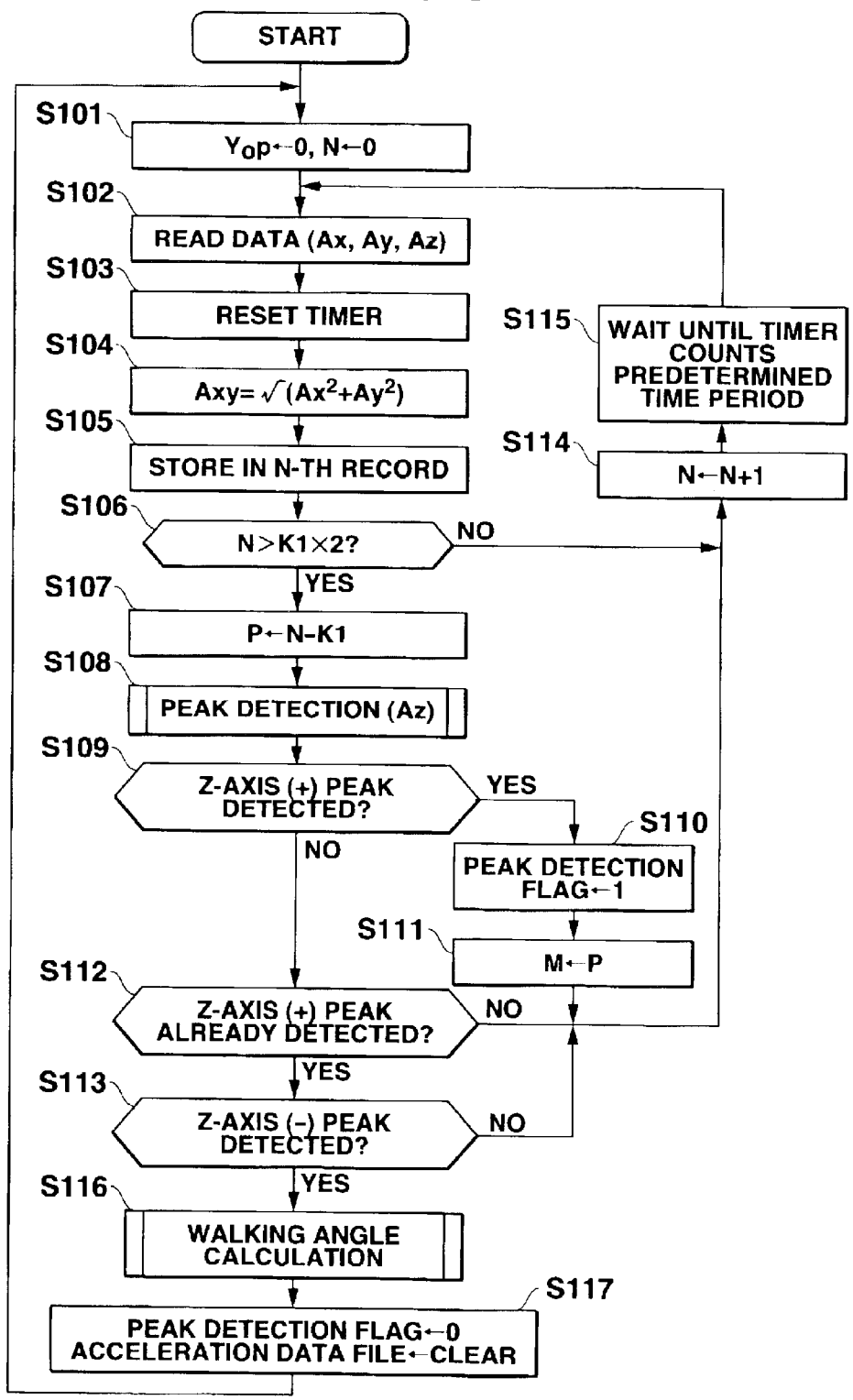
FIG. 9 is a flowchart showing the contents of a walking direction calculation process by the navigation apparatus shown in FIGS. 1A and 1B.

FIG. 9 is a flowchart showing the contents of the walking direction calculation process executed by the walking direction calculation unit 10 shown in FIG. 2.

In the following description, assume that the acceleration sensor 6 directly outputs components Ax, Ay, and Az of acceleration $\underline{A}$ in respective axial directions based on the vertical direction with respect to the ground, and acceleration components $Ax_0$, $Ay_0$, and $Az_0$ for the sake of simplicity. The vertical direction with respect to the ground is the direction, which is calculated in advance by the acceleration data management section 11, as described above. Acceleration components $Ax_0$, $Ay_0$, and $Az_0$ are those in the X-, Y-, and Z-axis directions detected by the acceleration sensor 6, as described above. Also, acceleration $\underline{A}$ is that upon movement of the navigation apparatus 1, which is calculated by the axial component calculator 11-1.

In step S101, the vertical component peak detection section 13 substitutes "0" as an initial value in variable $Y_0p$, and the acceleration data management section 11 substitutes "0" as an initial value in variable N. Variable N indicates a record number of the acceleration data file 12.

In step S102, the acceleration data management section 11 loads acceleration components Ax, Ay, and Az of current acceleration $\underline{A}$ of the navigation apparatus 1 from the acceleration sensor 6.

In step S103, the acceleration data management section 11 resets the value of its internal time measurement timer. A time measured by this timer is incremented by one every time a given time period elapses.

In step S104, the acceleration data management section 11 calculates synthetic acceleration component Axy by:

$$\sqrt{(Ax^2 + Ay^2)} \qquad (1)$$

In step S105, the acceleration data management section 11 stores data of acceleration components Ax, Ay, Az, and Axy acquired by the processes in steps S102 and S104 in a record with a record number corresponding to the value of variable N in the acceleration data file 12.

The acceleration data management section 11 checks in step S106 if the value of variable N is larger than the product "K1×2." If "Yes" in step S106, the flow advances to step S107; if "No" in step S106, the flow advances to step S114.

The process in step S106 will be explained in more detail below. In order to determine whether or not the value of data α of acceleration component Az, which is specified by variable P of the record number corresponds to a top peak as a portion where a change in curve that expresses a change over time in acceleration as a graph turns from up to down, a peak detection process corresponding to the process in step S108 to be described later requires data for "2×K1+1" samples as a total of samples corresponding to record numbers up to "K1+1" tracing backward from that corresponding to that data α, and samples corresponding to "K1" record numbers tracing forward from that of data α. Hence, it is confirmed by the process before the peak detection process in step S106 if the acceleration data file 12 stores a given number of data required for the peak detection process. Since the storage field of a record with record number "0" is prepared in the acceleration data file 12, the process in step S106 checks if variable N is larger than "2×K1" in place of checking if variable N is larger than "2×K1+1."

In step S107, the vertical component peak detection section 13 makes the subtraction "N−K1," and substitutes this difference in variable P.

In step S108, the vertical component peak detection section 13 executes a peak detection process for data of acceleration component Az corresponding to record number P, which is stored in the acceleration data file 12.

The vertical component peak detection section 13 checks in step S109 if the peak detection process in step S108 detects the top peak of a curve that expresses a change over time in acceleration component Az as a graph, i.e., a maximal peak. This checking process is implemented by reading out a peak detection flag (to be described later). If "Yes" in step S109, the flow advances to step S110; if "No" in step S109, the flow advances to step S112.

In step S110, the vertical component peak detection section 13 sets the peak detection flag to "1." The peak detection flag indicates whether or not a maximal peak of acceleration component Az is detected. In step S113, the peak detection flag is set to "1" to indicate that the maximal peak of acceleration component Az is detected. In the process in step S109 above, the vertical component peak detection section 13 reads out the peak detection flag, and if the section 13 determines that this peak detection flag is "1," the flow advances to step S112; if it determines that the peak detection flag is "0," the flow advances to step S110.

In step S111, the vertical component peak detection section 13 substitutes the value of variable P in variable M, and the flow advances to step S114. Variable M will be described later.

The value of P substituted in variable M by the process in step S111 indicates the record number in the acceleration data file 12 shown in FIG. 7. The value of P corresponds to data of acceleration component Az when the peak detection process corresponding to step S108 shown in FIG. 9 detects a maximal peak.

If "No" is determined in step S109, the vertical component peak detection section 13 checks in step S112 if a maximal peak of acceleration component Az has already been detected, i.e., the peak detection flag has already been set to "1." If "Yes" in step S112, the flow advances to step S113; if "No" in step S112, the flow advances to step S114.

The vertical component peak detection section 13 checks in step S113 if the peak detection process corresponding to step S108 above detects a bottom peak of a curve that expresses a change over time in acceleration component Az as a graph, i.e., a minimal peak. If "Yes" in step S113, the flow advances to step S116; if "No" in step S113, the flow advances to step S114.

If the vertical component peak detection section 13 determines in the processes in steps S112 and S113 that both the maximal and minimal peaks of acceleration component Az are detected, the flow advances to step S116; otherwise, the flow advances to step S114.

In step S114, the acceleration data management section 11 adds "1" to the current value of variable N, and substitutes that sum in variable N.

In step S115, the acceleration data management section 11 waits (pauses) a series of processes until the timer that was reset in step S103 above reaches a predetermined value. If the timer has reached the predetermined value, the flow returns to step S102.

With the time measured by the timer, acceleration components Ax, Ay, and Az of acceleration A upon movement of the navigation apparatus 1 are sampled at predetermined time intervals. This sampling process can follow a drastic change in acceleration but the processing load for the walking direction calculation process on the navigation apparatus 1 becomes heavier with decreasing sampling time interval. Hence, the sampling time interval is preferably set in consideration of the relationship between a degree of change in acceleration, and the processing load on the navigation apparatus 1. In this embodiment, the sampling time interval is set to 10 ms.

If "Yes" is determined in step S113, a walking angle calculation process corresponding to step S116 is executed. Details of this process will be explained later.

In step S117, the acceleration data management section 11 sets the peak detection flag to "0." Furthermore, the acceleration data management section 11 clears (erases) all data stored in the acceleration data file 12. Upon completion of the process in step S117, the flow returns to step S101.

The processes described so far correspond to the walking direction calculation process of the navigation apparatus 1 according to the first embodiment of the present invention.

Details of the peak detection process corresponding to the process in step S108 in the walking direction calculation process shown in FIG. 9 will be explained below. This peak detection process examines whether or not one data which belongs to an arbitrary data sequence is a peak (maximal or minimal point) of a curve which expresses that data sequence as a graph.

Figure 10:
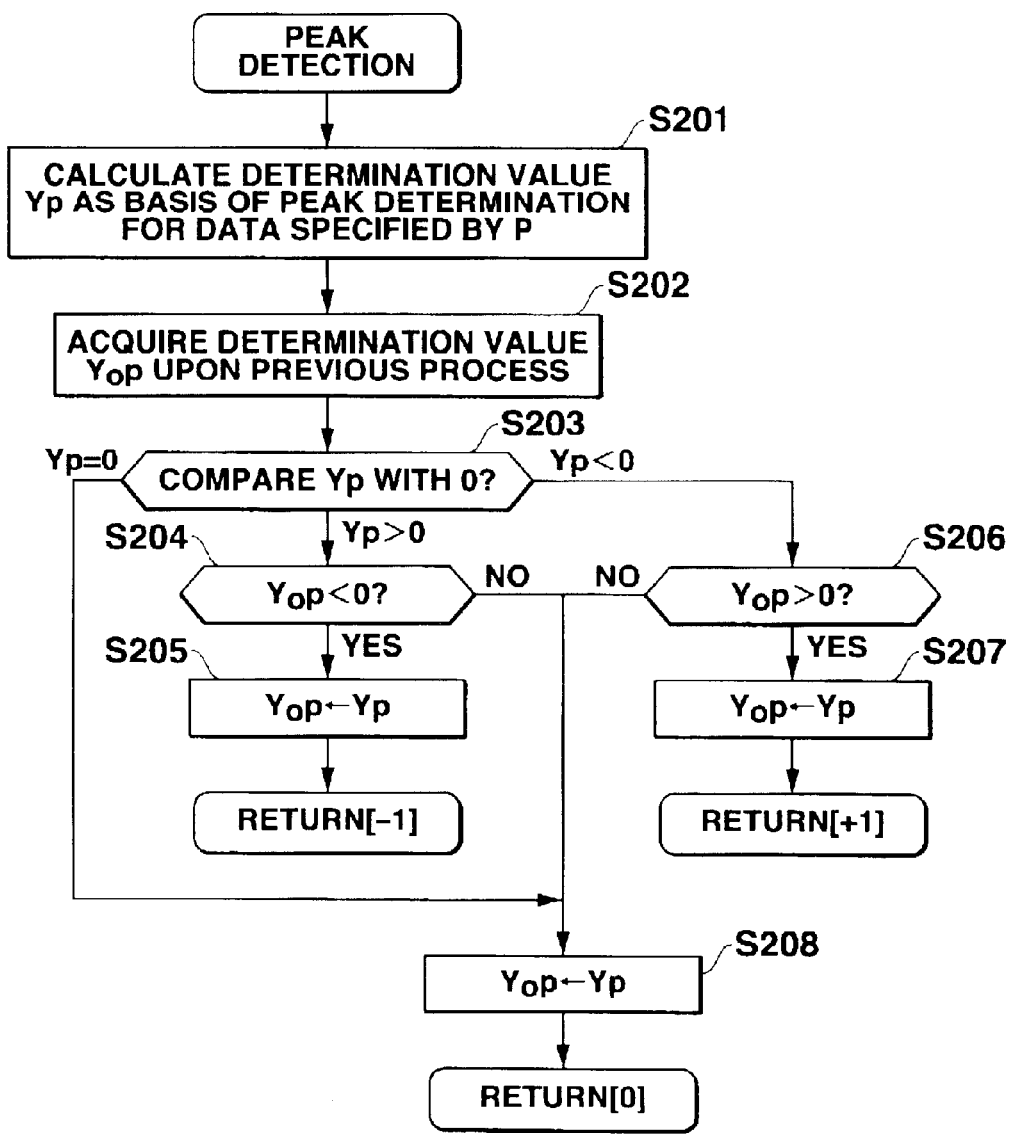
FIG. 10 is a flowchart showing the contents of a peak detection process by the navigation apparatus shown in FIGS. 1A and 1B.

FIG. 10 is a flowchart showing the contents of the peak detection process to be executed by the navigation apparatus 1 according to the first embodiment of the present invention.

In step S201, the acceleration data management section 11 reads out data of an acceleration component which is to undergo peak detection from a field with record number P in the acceleration data file 12, and calculates determination value Yp which corresponds to the readout data of the acceleration component. This determination value Yp serves as a basis for peak determination using a smoothing differential method (Savitsky-Golay algorithm) by the acceleration data management section 11.

A peak determination technique based on the smoothing differential method will be explained below.

Let A(n) be data to be determined, which belongs to an arbitrary data sequence, A(n−q) be the q-th data before A(n) in that data sequence, and A(n+q) be the q-th data after A(n).

At this time, determination value Y(n) is calculated by:

$$Y(n) = \sum_{k=-q}^{q} \left[ \{A(n+k) - A(n+k-1)\} \times k \right] \quad (2)$$

The part bounded by braces in equation (2) will be noted. In this part, the difference between neighboring data is calculated. Hence, if value k to be multiplied by that difference is always 1, the above equation becomes that for calculating the sum total of differences. In this case, as can be easily understood for those who are skilled in the art, if Y(n) assumes a positive value, this data sequence indicates an up tendency as a whole; if Y(n) assumes a negative value, this data sequence indicates a down tendency as a whole. Hence, by calculating determination value Y(n−1) for data A(n−1) immediately before A(n) in the data sequence, it is determined whether or not A(n) is a peak of a curve which expresses that data sequence as a graph.

That is, in this case, if Y(n)>0 and Y(n−1)<0, it is determined that A(n) is a bottom peak value of the curve which expresses that data sequence as a graph, i.e., a minimal value. On the other hand, if Y(n)<0 and Y(n−1)>0, it is determined that A(n) is a top peak value of the curve which expresses that data sequence as a graph, i.e., a maximal value.

Note that value k to be multiplied by the value in braces in equation (2) gives a weight to the difference between neighboring data. By giving weight k, since the influence of noise components contained in measured data A(n) to be determined can be reduced, a comprehensive up/down tendency of the whole data sequence can be determined by determination value Y(n).

In the peak detection process shown in FIG. 10, peak detection based on the aforementioned smoothing differential method is done.

Note that the smoothing differential method suitable for the peak detection process is adopted as a noise removal method. However, the present invention is not limited to such specific method. Noise may be removed by another method, and a peak may be detected by another method. A peak portion to be detected need not exactly be an apex portion of the observation waveform of the graph of the data sequence, but need only be used to determine top and bottom peak portions in repetitive cycles of up and down of an acceleration in the observation waveform.

The description will revert to step S201. Let A(p) be data of an acceleration component, which is to undergo peak detection, in a record with record number P stored in the acceleration data file 12. Then, in step S201 the vertical component peak detection section 13 calculates determination value Yp by calculating:

$$Yp = \sum_{k=-K1}^{K1} [\{A(P) - A(P-1)\} \times k] \quad (3)$$

In step S202, the vertical component peak detection section 13 acquires the value of variable $Y_0p$ which stores the determination value in the previous peak detection process, i.e., of peak determination for A(p−1).

In step S203, the vertical component peak detection section 13 compares determination value Yp calculated by the process in step S201 with "0." As a result, if Yp>0, i.e., if Yp assumes a positive value, the flow advances to step S204; if Yp<0, i.e., if Yp assumes a negative value, the flow advances to step S206; if Yp=0, the flow jumps to step S208.

The vertical component peak detection section 13 checks in step S204 if variable $Y_0p<0$, i.e., if variable $Y_0p$ assumes a negative value. If "Yes" in step S204, the flow advances to step S205; if "No" in step S204, the flow advances to step S208.

In step S205, the vertical component peak detection section 13 substitutes the value of determination value Yp calculated by the process in step S201 in variable $Y_0p$. The value of this variable $Y_0p$ is referred to in the next peak detection process.

Upon completion of the process in step S205, the peak detection process ends, and the flow advances to step S109 shown in FIG. 9. Since the process in step S205 is executed by the vertical component peak detection section 13 if it is determined in steps S203 and S204 that Yp>0 and $Y_0p<0$, i.e., that A(p) is a bottom peak of the curve that expresses the data sequence containing A(p) as a graph, a value "−1" indicating this determination result is returned to the process in step S109.

On the other hand, if the vertical component peak detection section 13 determines in step S203 that Yp<0, i.e., that Yp assumes a negative value, it checks in step S206 if variable $Y_0p>0$, i.e., the value of variable $Y_0p$ is positive. If "Yes" in step S206, the flow advances to step S207; if "No" in step S206, the flow advances to step S208.

In step S207, the vertical component peak detection section 13 substitutes the value of determination value Yp calculated by the process in step S201 in variable $Y_0p$. The value of this variable $Y_0p$ is used in the next peak detection process.

Upon completion of the process in step S207, the peak detection process ends, and the flow advances to step S109 shown in FIG. 9. Since the process in step S207 is executed by the vertical component peak detection section 13 if it is determined in steps S203 and S206 that Yp<0 and $Y_0p>0$, i.e., that A(p) is a top peak of the curve that expresses the data sequence containing A(p) as a graph, a value "+1" indicating this determination result is returned to the process in step S109.

If it is determined in step S203 that Yp=0, or if "No" in step S204 or S206, the vertical component peak detection section 13 substitutes the value of determination value Yp calculated by the process in step S201 in variable $Y_0p$ in step S208.

Upon completion of the process in step S208, the peak detection process ends, and the flow advances to step S109 shown in FIG. 9. Since the process in step S208 is executed if the vertical component peak detection section 13 determines in steps S203, S204, or S206 that A(p) is not a peak of the curve that expresses the data sequence containing A(p) as a graph, a value "0" indicating this determination result is returned to the process in step S109.

The peak detection process by the vertical component peak detection section 13 has been explained.

In the peak detection process described so far, the vertical component peak detection section 13 executes various processes. The vertical component peak detection section 13 executes the peak detection process when data which is to undergo peak detection is data of Z-acceleration component Az.

The walking angle calculation process corresponding to the process in step S116 in the walking direction calculation process shown in FIG. 9 will be described below. This process detects a peak of synthetic acceleration component Axy which appeared after the peak of vertical acceleration component Az, which has already been acquired by the walking direction calculation process, calculates a walking angle which indicates the travel direction of walking of the carrier with reference to the azimuth of the navigation apparatus 1 based on X- and Y-acceleration components of this acceleration component Axy as the peak, and registers the calculated walking angle in the walking angle data file 17.

Figure 11:
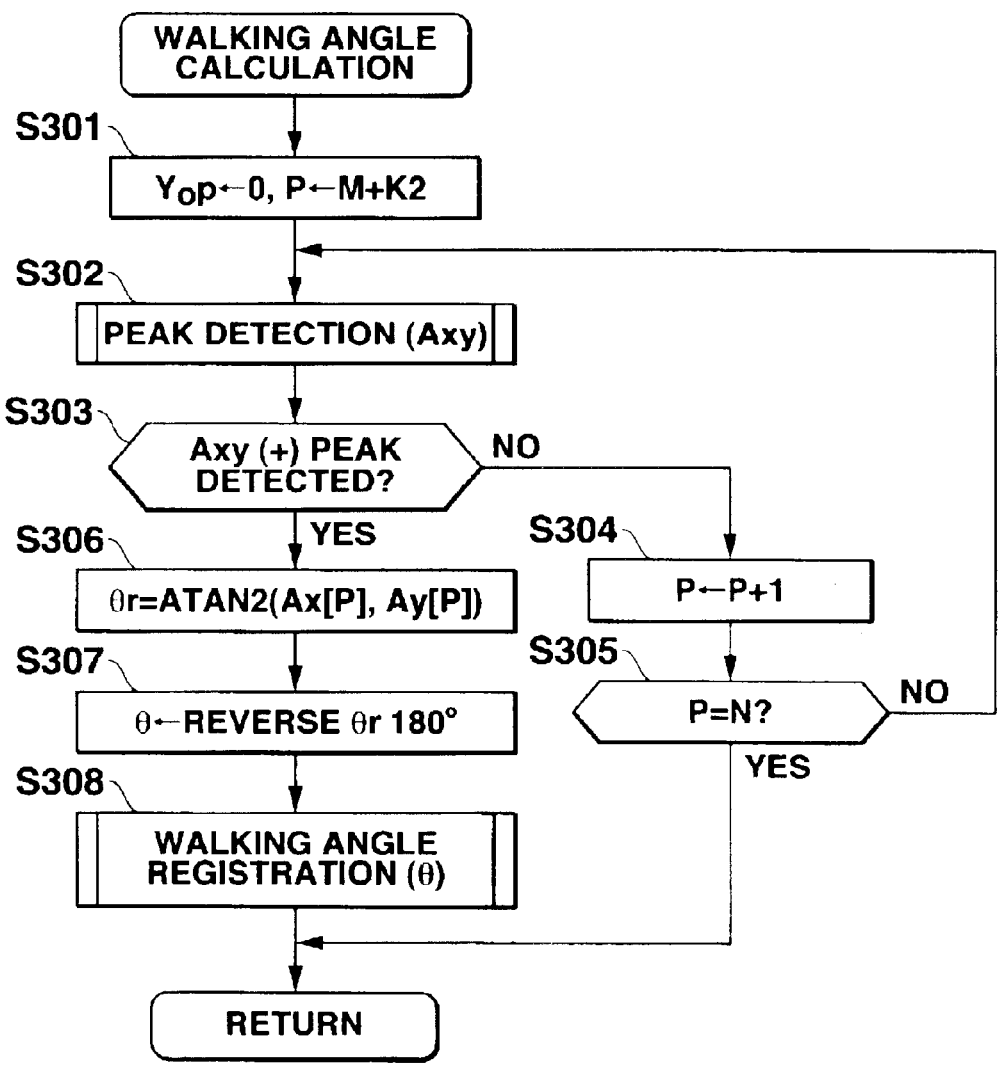
FIG. 11 is a flowchart showing the contents of a walking angle calculation process by the navigation apparatus shown in FIGS. 1A and 1B.

FIG. 11 is a flowchart showing the contents of the walking angle calculation process to be executed by the navigation apparatus 1 according to the first embodiment of the present invention.

In step S301, the horizontal component peak detection section 14 substitutes "0" as an initial value in variable $Y_0p$, and also substitutes the sum "M+K2" in variable P.

Variable M and constant K2 in the process in step S301 will be described below.

The value of variable M is that of variable P which is substituted in step S111 in the walking direction calculation process shown in FIG. 9. That is, variable M indicates the record number of acceleration component Az of a maximal peak, when the maximal peak of a curve that expresses a data sequence of acceleration components Az as a graph is detected by the peak detection process corresponding to the process in step S108 in FIG. 9. The record number is used to identify the storage location of specific acceleration data among those stored in the acceleration data file 12, as described above.

Therefore, in the acceleration data file 12, the storage location of the absolute value of the acceleration component corresponding to the record number which is equal to the value of variable P obtained by substituting the sum of the values of variable M and constant K2 is a location corresponding to a record number "K2" larger than the record number corresponding to the maximal peak of acceleration component Az, as shown in FIG. 7.

In walking motion of the carrier, a maximal peak of the synthetic acceleration in the horizontal direction with respect to the ground appears, after a delay of a given period, behind that of the acceleration component in the vertical direction with respect to the ground, as described above. In other words, synthetic acceleration components in the horizontal direction from the detection time of the vertical acceleration component as the maximal peak until a given time period elapses from that detection time never include a maximal peak.

With the above examination, constant "K2" is adopted to exclude data of synthetic acceleration components Axy, which are acquired from the detection time of the maximal peak of vertical acceleration component Az until a given time period elapses from that detection time, from objects of the next peak detection process. As a result, since data of synthetic acceleration components Axy within the range from a record number corresponding to the maximal peak of vertical acceleration component Az to a record number obtained by adding "K2" to the record number corresponding to the maximal peak are excluded, the possibility of peak detection errors is reduced, and the processing volume for the peak detection process by the horizontal component peak detection section 14 can be reduced.

The description will revert to FIG. 11.

In step S302, the horizontal component peak detection section 14 executes a peak detection process for data of synthetic acceleration component Axy with record number P stored in the acceleration data file 12. The processing contents of this peak detection process are substantially the same as those shown in FIG. 10. In this case, data which is to undergo peak detection is that of acceleration component Axy, and this process is executed by the horizontal component peak detection section 14, unlike in the peak detection process corresponding to the process in step S108 in the walking direction calculation process shown in FIG. 9.

The horizontal component peak detection section 14 checks in step S303 if the peak detection process in step S302 detects a top peak of a curve that expresses a data sequence of acceleration components Axy as a graph, i.e., a maximal peak. If "Yes" in step S303, the flow advances to step S306; if "No" in step S303, the flow advances to step S304.

In step S304, the horizontal component peak detection section 14 adds "1" to the current value of variable P, and substitutes the sum in variable P.

The horizontal component peak detection section 14 checks in step S305 if the value of variable P is equal to that of variable N. If "Yes" in step S305, the walking angle calculation process ends, and the flow advances to step S117 shown in FIG. 9. On the other hand, if "No" in step S305, the flow returns to step S302.

"Yes" is determined in step S305 when data of acceleration components Axy stored in the acceleration data file 12 do not include any component corresponding to a maximal peak. In such case, the walking angle calculation section 15 cannot calculate walking angle data. That is, the process in step S305 is executed to inhibit calculations of walking angle data based on the acceleration component data stored in the acceleration data file 12 when data of acceleration components Axy stored in the acceleration data file 12 do not include any component corresponding to a maximal peak.

If "Yes" in step S303, in step S306 the walking angle calculation section 15 calculates angle $\theta_r$ of acceleration component Axy when the peak detection process in step S302 detects a maximal peak of acceleration component Axy. The walking angle calculation section 15 calculates $\theta r$ by acquiring the absolute values of X- and Y-components Ax and Ay of data of acceleration component Axy stored in a record corresponding to record number P in the acceleration data file 12, i.e., acceleration component Axy as the maximal peak in a data sequence of acceleration components Axy, and calculating:

$$\theta_r = \tan^{-1} \frac{Ay}{Ax} \qquad (4)$$

Angle $\theta_r$ is an angle that the X-axis of XY orthogonal axes defined on a plane parallel to the ground makes with acceleration component Axy.

In step S307, the angle converter 15-1 reverses the angle $\theta_r$ calculated by the process in step S306 through 180° to acquire angle $\theta$ that indicates a direction opposite to acceleration component Axy, i.e., the travel direction of walking motion of the carrier. Angle $\theta$ can assume a value that falls within the range $0° \leq \theta \leq 360°$.

In step S308, the walking angle data management section 16 executes a walking angle registration process for registering angle $\theta$ acquired in step S307 in the walking angle data file 17. Then, the walking angle calculation process ends, and the flow advances to step S117 shown in FIG. 9. Details of the walking angle registration process will be described later.

The walking angle calculation process by the walking angle calculation section 15 has been explained.

In this embodiment, one point of an apex portion on an observation waveform of horizontal acceleration components is detected as a maximal peak, and the direction of the horizontal acceleration component at a time corresponding to one point of the apex portion is determined as a walking angle. In place of only one point of the apex portion, the directions of horizontal acceleration components at times corresponding to a plurality of points before and after that apex may be averaged, and the averaged direction may be determined as the direction of the acceleration component corresponding to a maximal peak portion. Alternatively, a velocity change direction may be calculated by integrating acceleration components at times corresponding to the plurality of points before and after the apex, and a walking angle may be calculated based on the velocity change direction.

Figure 12:
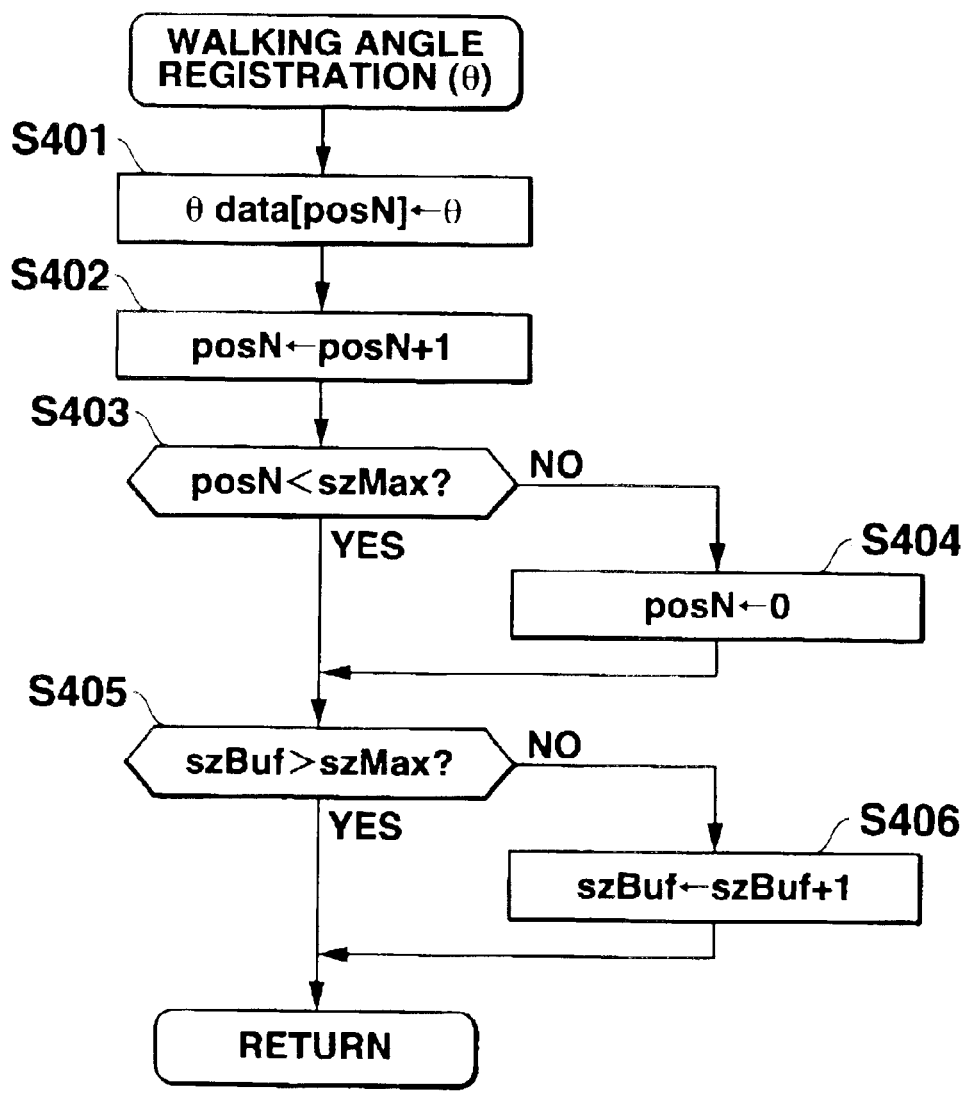
FIG. 12 is a flowchart showing the contents of a walking angle registration process by the navigation apparatus shown in FIGS. 1A and 1B.

The walking angle registration process corresponding to the process in step S308 in the aforementioned walking angle calculation process shown in FIG. 11 will be described in detail below. FIG. 12 is a flowchart showing the contents of the walking angle registration process to be executed by the walking angle data management section 16 shown in FIG. 6.

In step S401, the walking angle data management section 16 stores angle $\theta$ acquired by the process in step S307 in the walking angle calculation process shown in FIG. 11 in a predetermined record in the walking angle data file 17. The predetermined record is a record ([θdata[posN]]) which has a value of variable posN as a record number. Note that the walking angle data management section 16 initializes variable posN by substituting "0" in it before the beginning of the walking direction calculation process shown in FIG. 9.

In step S402, the walking angle data management section 16 adds "1" to the current value of variable posN, and substitutes the sum in variable posN.

The walking angle data management section 16 checks in step S403 if the current value of variable posN is smaller than constant "szMax (see FIGS. 8A and 8B)." Constant "szMax" is a value stored in the walking angle data file 17. Constant "szMax" is a maximum record number assigned to a record used to store angle θ.

The walking angle data management section 16 substitutes "0" in variable posN in step S404 when "No" is determined in step S403. With the processes in steps S403 and S404, the storage fields of angles θ in the walking angle data file 17 serve as a ring buffer.

The walking angle data management section 16 checks in step S405 if the current value of variable "szBuf" is larger than constant "szMax" mentioned above. The walking angle data management section 16 adds "1" to the current value of variable "szBuf" and substitutes the sum in variable "szBuf" in step S406 when "No" is determined in step S405. Note that this variable "szBuf" is a value stored in the walking angle data file 17, and indicates the number of data of angles θ. Once the walking angle data management section 16 stores data of angles θ in all storage fields of angles θ in the walking angle data file 17, variable "szBuf" is fixed to "szMax+1," i.e., the number of records which are prepared in the walking angle data file 17 to store angles θ. Note that the walking angle data management section 16 initializes variable "szBuf" by substituting "0" in it before the beginning of the walking direction calculation process shown in FIG. 9.

Upon completion of the processes in steps S405, and S406, the walking angle registration process ends, and the flow advances to step S117 shown in FIG. 9.

The walking angle registration process has been explained.

Figure 13:
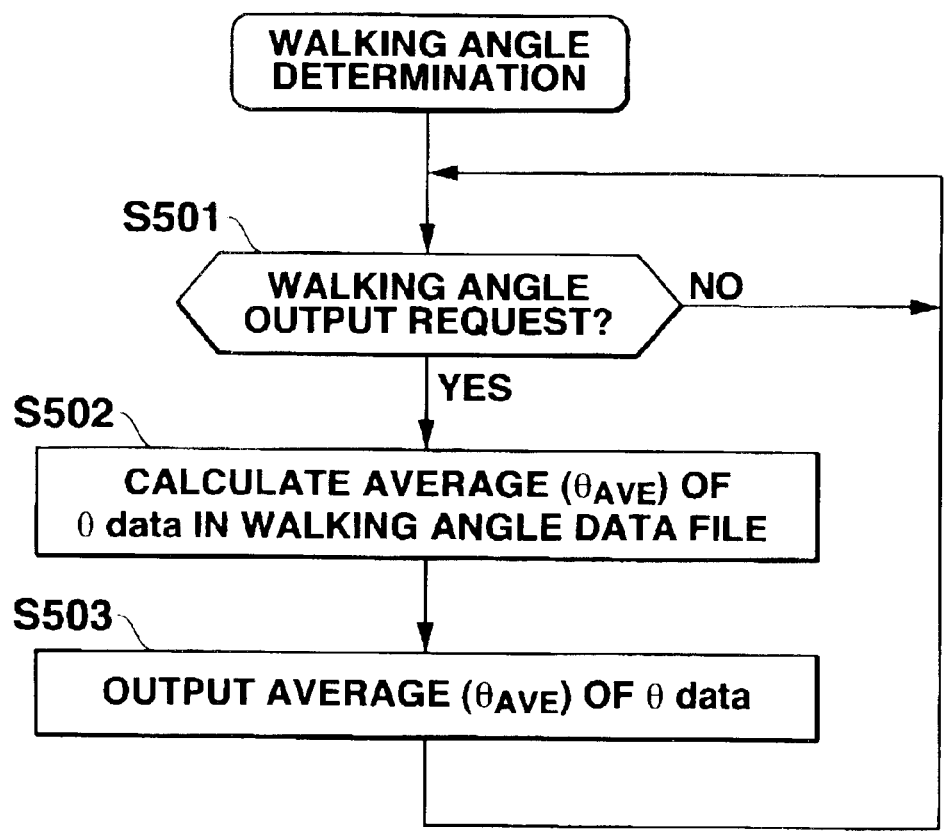
FIG. 13 is a flowchart showing the contents of a walking angle determination process by the navigation apparatus shown in FIGS. 1A and 1B.

A walking angle determination process will be described below. FIG. 13 is a flowchart showing the contents of the walking angle determination process. This walking angle determination process is executed by the walking angle output section 18. This process calculates an angle as the average of the sum of walking angle data stored in the walking angle data file 17 by the walking angle registration process shown in FIG. 12, and outputs angle $θ_A$ as this calculation result as the final calculation result of the walking direction. With this process, since the tendency of repetitively calculated walking directions is output as the final detection result of the walking direction, a very short disturbance in the calculation result of the walking direction can be compensated for.

This process starts simultaneously with the start of the operation of the navigation apparatus 1.

The walking angle output section 18 checks in step S501 if it receives an output request of angle $θ_A$ from the walking azimuth calculation unit 40, and waits until "Yes" is determined.

If "Yes" in step S501, the walking angle output section 18 reads out all angles θ stored in respective records of the walking angle data file 17 and calculates the sum total of those angles in step S502. The walking angle output section 18 divides the calculated sum total of angles θ by variable "szBuf" mentioned above to calculate angle $θ_{AVE}$. Angle $θ_{AVE}$ is the average of the sum of angles θ stored in respective records of the walking angle data file 17.

In step S503, the walking angle output section 18 outputs angle $θ_{AVE}$ calculated in step S502 as $θ_A$ to the walking azimuth calculation unit 40, and the flow then returns to step S501.

The walking angle determination process has been described.

When the walking direction calculation unit 10 executes the aforementioned processes shown in FIGS. 9 to 13, the travel direction in walking motion is calculated based on the detection values of X-, Y-, and Z-acceleration components by the acceleration sensor 6.

Figure 14A:
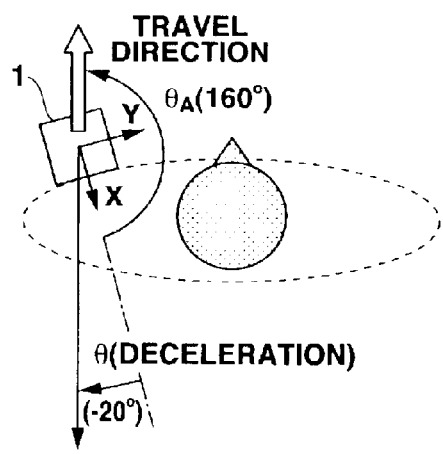
FIG. 14A is a view for explaining a method of calculating the walking angle of the carrier of the navigation apparatus shown in FIGS. 1A and 1B.
Figure 14B:
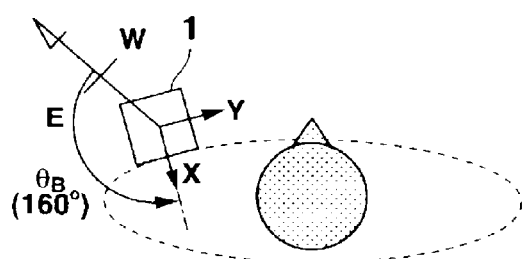
FIG. 14B is a view for explaining a method of calculating the azimuth of the navigation apparatus shown in FIGS. 1A and 1B.
Figure 14C:
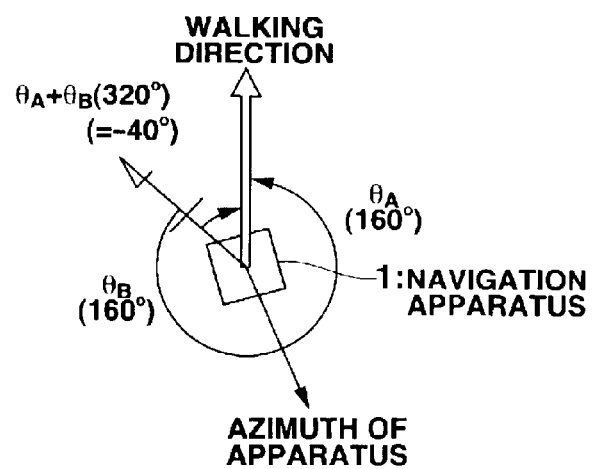
FIG. 14C is a view for explaining a method of calculating the walking direction of the carrier of the navigation apparatus shown in FIGS. 1A and 1B.

After that, the walking azimuth calculation unit 40 calculates the azimuth of the walking direction in walking motion with reference to magnetic north, as exemplified in FIG. 14C, by adding walking angle $θ_A$ exemplified in FIG. 14A, and azimuth angle $θ_B$ exemplified in FIG. 14B. Note that walking angle $θ_A$ is calculated by the walking direction calculation unit 10 with reference to the X-axis of the XY orthogonal axes. The XY orthogonal axes are those defined on a plane parallel to the ground. On the other hand, azimuth angle $θ_B$ is calculated by the apparatus azimuth calculation unit 30. Azimuth angle $θ_B$ is an azimuth angle with reference to the X-axis of the XY orthogonal axes. The azimuth angle along the X-axis is calculated with reference to magnetic north.

Other calculation methods of the travel direction in walking motion by the walking direction calculation unit 10 mentioned above based on the detection values of X-, Y-, and Z-acceleration components will be explained hereinafter.

The second embodiment of the present invention as one of the other calculation methods of the travel direction will be described first. In the synthetic acceleration graphs shown in FIGS. 4 and 5, maximal peaks of synthetic accelerations in the deceleration direction with respect to the travel direction in walking motion appear clearly. However, depending on subjects, road surfaces on which a person walks, the setting positions of the acceleration sensor 6, and the like, a maximal peak of a synthetic acceleration which is produced before the foot that has passed by the other foot touches the ground, i.e., a maximal peak of a synthetic acceleration in the acceleration direction with respect to the travel direction in walking motion is often clearly observed. The maximal peak of this synthetic acceleration in the acceleration direction appears in the time interval between those of minimal and maximal peaks of a vertical acceleration, and at a time a given period, e.g., a period around ¼ to ⅕ of the walking pitch ahead of the maximal peak.

Hence, in the second embodiment, the walking direction calculation unit 10 detects a maximal peak of a vertical acceleration in accordance with the acceleration observed by the acceleration sensor 6. Then, the unit 10 detects a maximal peak of a synthetic acceleration which has already appeared before the maximal peak of the vertical acceleration in correspondence with the maximal peak of the vertical acceleration. Finally, the unit 10 calculates the direction of the synthetic acceleration at the detection time of the maximal peak of the synthetic acceleration on a plane parallel to the ground, as the walking direction of the carrier.

The structure of the navigation apparatus 1 according to the second embodiment can be the same as that shown in FIG. 1.

The arrangement of the navigation apparatus 1 according to the second embodiment can be the same as that shown in FIGS. 2 and 6, but the angle converter 15-1 shown in FIG. 6 can be omitted.

The sequence of processes executed by the walking direction calculation unit 10 in the navigation apparatus 1 according to the second embodiment will be described below.

Figure 15:
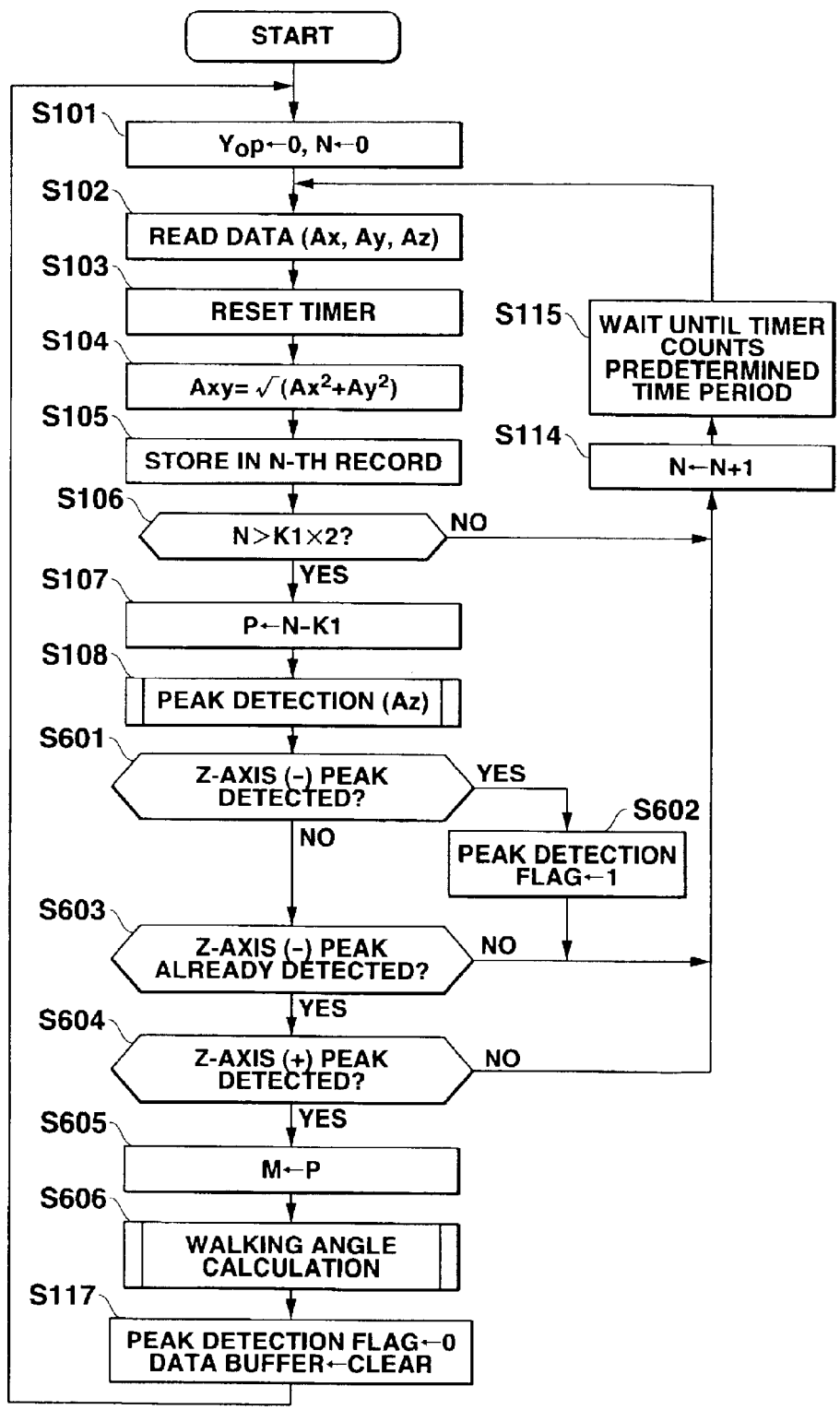
FIG. 15 is a flowchart showing the contents of a walking direction calculation process by a navigation apparatus according to the second embodiment of the present invention.

FIG. 15 will be described first. FIG. 15 is a flowchart showing the contents of the walking direction calculation process executed by the walking direction calculation unit 10 of the navigation apparatus 1 according to the second embodiment of the present invention. Note that the same step numbers in FIG. 15 denote the same processes as those in FIG. 9.

As in the description of FIG. 9, in the following description, assume that X-, Y-, and Z-acceleration components Ax, Ay, and Az of acceleration $\underline{A}$ upon movement of the navigation apparatus 1 are calculated based on the vertical direction with respect to the ground, which is calculated in advance, and X-, Y-, Z-acceleration components $Ax_0$, $Ay_0$, and $Az_0$ detected by the acceleration sensor 6, and the acceleration sensor 6 directly outputs such information for the sake of simplicity. Also, acceleration components Ax, Ay, and Az are calculated by the axial component calculator 11-1 as in the first embodiment.

The processes in steps S101 to S108 in FIG. 15 are the same as those in FIG. 9.

Upon completion of a peak detection process for acceleration component Az as a process corresponding to that in step S108 shown in FIG. 15, the vertical component peak detection section 13 checks in step S601 if the peak detection process in step S108 detects the bottom peak of a curve that expresses a change in acceleration component Az as a graph, i.e., a minimal peak. If "Yes" in step S601, the flow advances to step S602; if "No" in step S601, the flow advances to step S603.

In step S602, the vertical component peak detection section 13 sets the peak detection flag to "1," and the flow advances to step S114. The peak detection flag indicates whether or not a minimal peak of acceleration component Az is detected. The vertical component peak detection section 13 sets the peak detection flag to "1" to indicate that the maximal peak of acceleration component Az is detected.

If "No" is determined in step S601, the vertical component peak detection section 13 checks in step S603 if a minimal peak of the curve that expresses change in acceleration component Az as a graph has already been detected, i.e., the peak detection flag is set to "1." If "Yes" in step S603, the flow advances to step S604; if "No" in step S603, the flow advances to step S114.

The vertical component peak detection section 13 checks in step S604 if the peak detection process corresponding to step S108 above detects a top peak of the curve that expresses a change in acceleration component Az as a graph, i.e., a maximal peak. If "Yes" in step S604, the flow advances to step S605; if "No" in step S604, the flow advances to step S114.

When both the minimal and maximal peaks of acceleration component Az are detected in the processes in steps S603 and S604, the flow advances to step S605; otherwise, the flow advances to step S114.

The processes in steps S114 and S115 shown in FIG. 15 are the same as those shown in FIG. 9.

If "Yes" is determined in step S604, the vertical component peak detection section 13 executes a process for substituting the value of variable P in variable M in step S605. The value of P substituted in variable M by this process is the same as that of P obtained as a result of the process in step S111 shown in FIG. 9.

In step S606, the walking angle calculation section 15 shown in FIG. 6 executes a walking angle calculation process. The walking angle calculation process according to the second embodiment is slightly different from the process executed in step S116 in FIG. 9. Details of this process will be described later.

The process in step S117 executed after step S606 shown in FIG. 15 is the same as that shown in FIG. 9.

The walking direction calculation process according to the second embodiment has been explained.

The walking angle calculation process corresponding to the process in step S606 in the walking direction calculation process shown in FIG. 15 will be described below. This process detects a maximal peak of acceleration component Axy which appeared at a time before the time of the maximal peak of acceleration component Az, which has already been acquired by the walking direction calculation process, calculates a walking angle which indicates the travel direction of walking of the carrier based on X- and Y-acceleration components of this acceleration component Axy as the peak, and registers the calculated walking angle in the walking angle data file 17.

Figure 16:
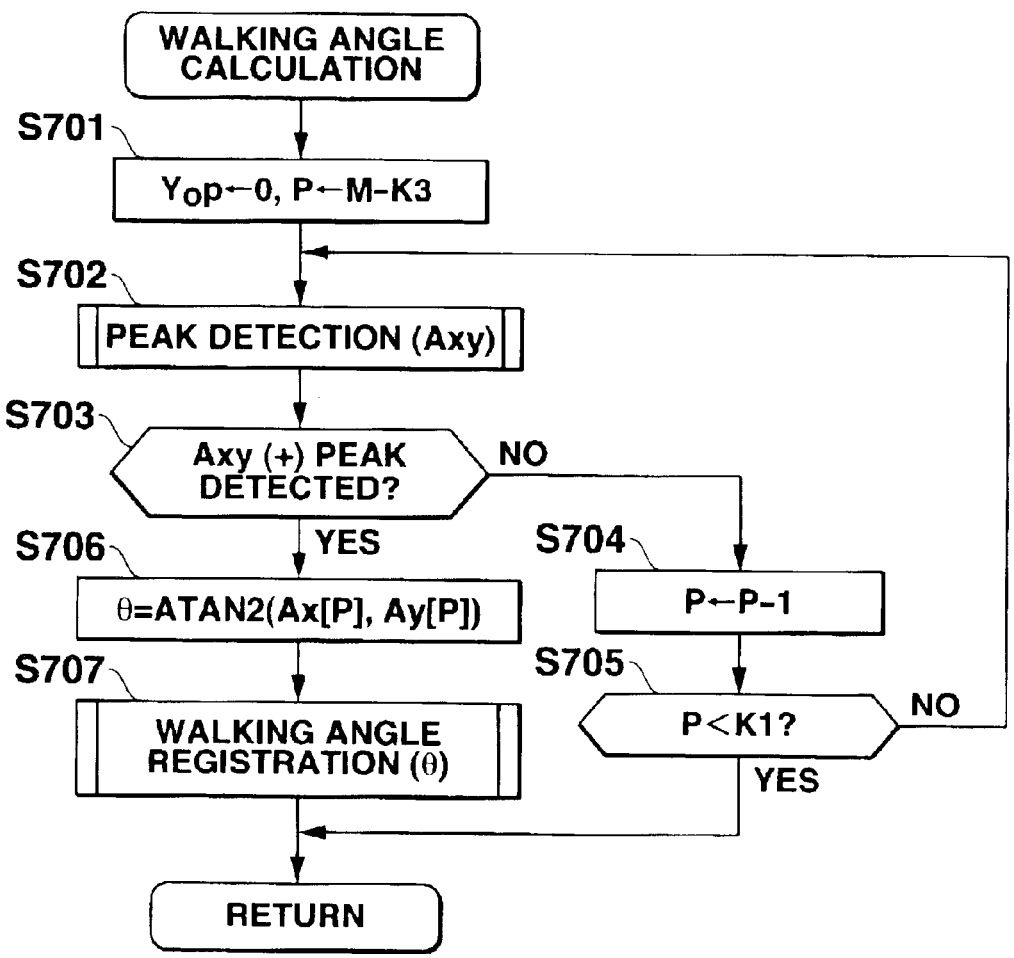
FIG. 16 is a flowchart showing the contents of a walking angle calculation process by the navigation apparatus according to the second embodiment of the present invention.

FIG. 16 will be described below. FIG. 16 is a flowchart showing the contents of the walking angle calculation process according to the second embodiment of the present invention.

In step S701, the horizontal component peak detection section 14 substitutes "0" as an initial value in variable $Y_0p$, and also substitutes the sum "M+K3" in variable P.

The value of variable M is that of variable P which is substituted in step S605 in the walking direction calculation process shown in FIG. 15. That is, variable M indicates the record number of acceleration component Az of a maximal peak, when the maximal peak of a curve that expresses a data sequence of acceleration components Az as a graph is detected by the peak detection process (see FIG. 10) corresponding to the process in step S108 in FIG. 15. The record number is used to identify the storage location of specific acceleration data among those stored in the acceleration data file 12, as described above.

Also, constant "K3" is adopted to exclude data of acceleration components Axy, which are acquired within the time period from a time a given period of time before the detection time of the maximal peak of acceleration component Az until the detection time of that maximal peak, from objects of the next peak detection process, and to set data of acceleration components Axy acquired the given period of time before the detection time of the maximal peak to be objects which are to undergo maximal peak detection. As a result, since data of acceleration components Axy within the range from a record number corresponding to the maximal peak of acceleration component Az to a record number obtained by subtracting "K3" from the record number corresponding to the maximal peak are excluded from acceleration data stored in the acceleration data file 12, the possibility of peak detection errors is reduced, and the processing volume for the peak detection process can be reduced.

The process in step S702 is the same as that in step S302 shown in FIG. 11. That is, in step S702 the horizontal component peak detection section 14 executes a peak detection process shown in FIG. 10 for acceleration components Axy. The horizontal component peak detection section 14 checks in step S703 if the peak detection process detects a positive peak of a curve that expresses a data sequence containing acceleration components Axy as a graph, i.e., a maximal peak. If "Yes" in step S703, the flow advances to step S706; if "No" in step S703, the flow advances to step S704.

In step S704, the horizontal component peak detection section 14 subtracts "1" from the current value of variable P, and substitutes the difference in variable P.

Unlike in the process in step S304 shown in FIG. 11, the horizontal component peak detection section 14 makes a subtraction from variable P in step S704. This subtraction is made to decrement, one by one, the value of the record number corresponding to data of acceleration component Axy to be read out to detect a maximal peak from the acceleration data sequence in the peak detection process corresponding to step S702.

The horizontal component peak detection section 14 checks in step S705 if the value of variable P is smaller than constant "K1" mentioned above. If "Yes" in step S705, the walking angle calculation process ends, and the flow advances to step S117. On the other hand, if "No" in step S705, the flow returns to step S702.

"Yes" is determined in step S705 when data of acceleration components Axy stored in the acceleration data file 12 do not include any component corresponding to a maximal peak within an allowable peak detection range of the peak detection process in step S702. In such a case, walking angle data cannot be calculated from data stored in the acceleration data file 12.

If "Yes" is determined in the process in step S703, in step S706 the walking angle calculation section 15 calculates angle $\theta$ of acceleration component Axy, which has been detected as a maximal peak by the peak detection process in step S702. The calculation formula of $\theta$ is that which applies the right-hand side of the calculation formula of $\theta_r$ in equation (4) above correspondingly.

In the walking angle calculation process according to the first embodiment shown in FIG. 11, the process of step S307 that reverses angle $\theta_r$ by 180° by the angle converter 15-1 is executed between the processes of steps S306 and S308. However, in the walking angle calculation process according to the second embodiment, angle $\theta$ of acceleration component Axy corresponding to a maximal peak upon detection of the maximal peak by the peak detection process corresponding to step S702 indicates the travel direction of walking motion of the carrier. Hence, in the walking angle calculation process shown in FIG. 16, the process corresponding to step S307 shown in FIG. 11 can be omitted.

In step S707, the walking angle data management section 16 executes a walking angle registration process for registering angle $\theta$ acquired in step S706 in the walking angle data file 17. Then, the walking angle calculation process ends, and the flow advances to step S117 shown in FIG. 15. The walking angle registration process can be the same as that shown in FIG. 12.

The walking angle calculation process according to the second embodiment of the present invention has been explained.

Note that the walking angle output section 18 executes the same walking angle determination process as that shown in FIG. 13.

When the walking direction calculation unit 10 executes the processes shown in FIGS. 15 and 16, FIGS. 10 and 12, and FIG. 13 described above, the calculation process of the travel direction of walking motion based on the X-, Y-, and Z-acceleration component.

As described above, the second embodiment of the present invention is effective when the maximal peak of a synthetic acceleration in the acceleration direction with respect to the travel direction of walking motion is clear compared to the first embodiment that has already been explained above.

The third embodiment of the present invention will be described below.

The third embodiment is one of the calculation methods of the travel direction of a pedestrian.

The third embodiment compares a maximal peak value detected according to the first embodiment, i.e., the maximal peak value of an acceleration in the deceleration direction of walking motion, and a maximal peak value detected according to the second embodiment, i.e., the maximal peak value of an acceleration in the acceleration direction of walking motion. Then, the third embodiment determines an acceleration component having a larger absolute value as a clear maximal peak, and uses it as a determination criterion of travel direction, thus calculating the walking direction of a carrier. In this way, the precision of the calculated walking direction can be improved compared to the first and second embodiments described above.

The structure of the outer appearance of the navigation apparatus 1 according to the third embodiment can be the same as that shown in FIG. 1. Also, the internal structure of the navigation apparatus 1 according to the third embodiment can be the same as that shown in FIGS. 2 and 6.

The sequence of processes executed by this walking direction calculation unit 10 in the navigation apparatus 1 according to the third embodiment will be described below.

In the third embodiment, the walking direction calculation process to be executed by the walking direction calculation unit 10 can be the same as that shown in FIG. 9. However, the walking angle calculation process corresponding to the process in step S116 in FIG. 9 must be different from that shown in FIG. 11.

Figure 17:
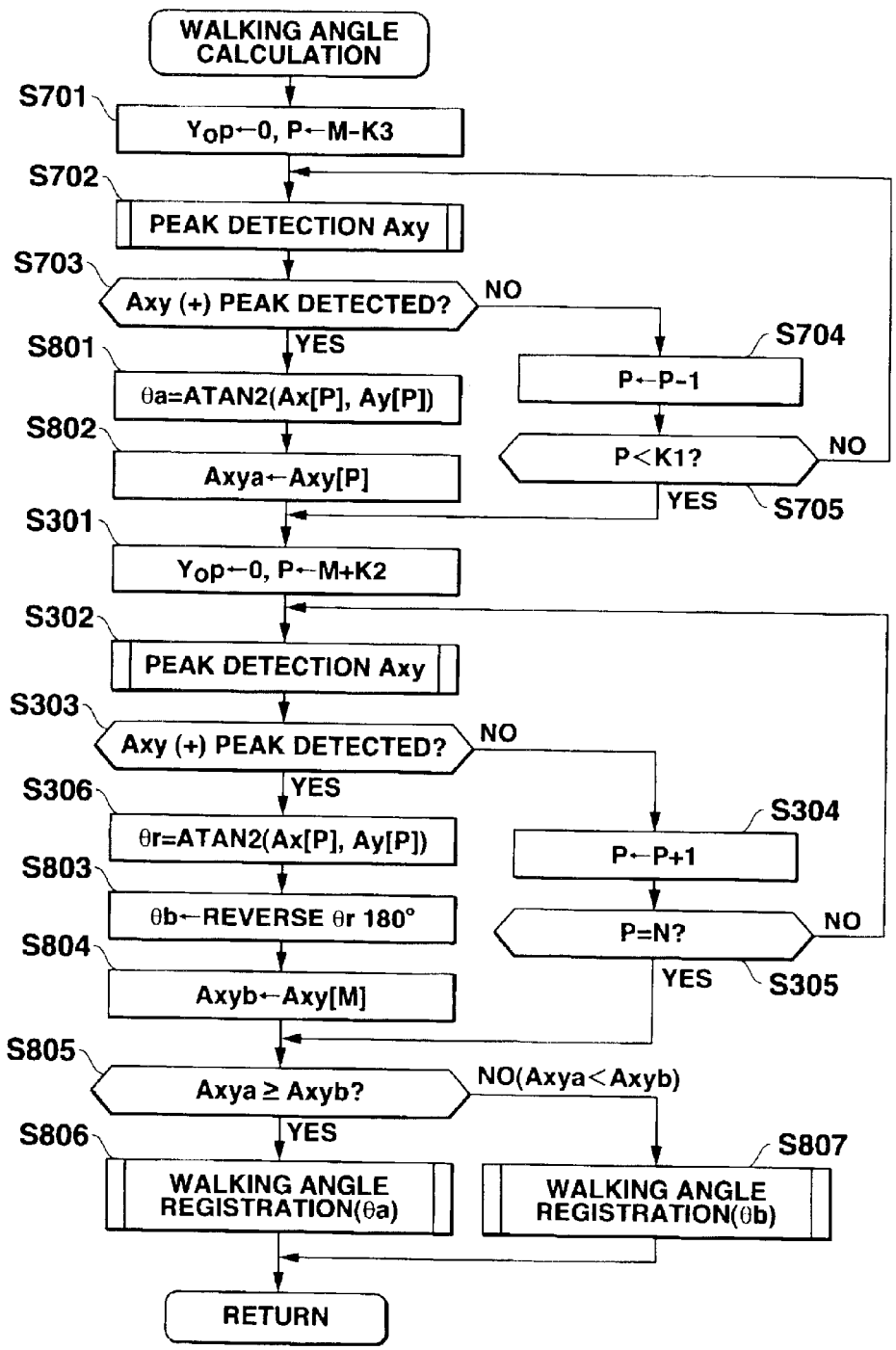
FIG. 17 is a flowchart showing the contents of a walking direction calculation process by a navigation apparatus according to the third embodiment of the present invention.

FIG. 17 will be explained below. FIG. 17 is a flowchart showing the contents of the walking angle calculation process in the third embodiment. The same step numbers in FIG. 17 denote the same processes as those in the first embodiment shown in FIG. 11, or those in the second embodiment shown in FIG. 16.

An outline of the process shown in FIG. 17 will be explained below. The processes in steps S701, S702, S703, S704, and S705 shown in FIG. 17 are the same as those shown in FIG. 16. Also, the process in step S801 is the same as that in step S706 shown in FIG. 16. Note that an angle calculated by the process in step S801 will be expressed by $\theta_a$.

On the other hand, the processes in steps S301, S302, S303, S304, and S305 shown in FIG. 17 are the same as those shown in FIG. 16. Also, the process in step S803 is the same as that in step S307 shown in FIG. 11. Note that an angle calculated by the process in step S803 will be expressed by $\theta_b$.

In FIG. 17, the processes in steps S701, S702, S703, S704, and S705 shown in FIG. 17 are the same as those shown in FIG. 16. However, if "Yes" is determined in the process in step S703, the flow advances to step S801; if "Yes" is determined in the process in step S705, the flow advances to step S301.

If "Yes" in step S703, in step S801 the walking angle calculation section 15 calculates angle $\theta_a$ of acceleration component Axy, which is detected as a maximal peak by the peak detection process for acceleration components Axy corresponding to step S702. The calculation formula of $\theta_a$ is that which applies the right-hand side of the calculation formula of $\theta_r$ in equation (4) above correspondingly.

In step S802, the walking angle calculation section 15 substitutes the absolute value of acceleration component Axy, which is determined to be a maximal peak by the process in step S703, in variable Axya. The flow then advances to step S301.

In FIG. 17, the processes in steps S301, S302, S303, S304, S305, and S306 are substantially the same as those shown in FIG. 11, except that if "Yes" in step S305, the flow advances to step S805, and the process in step S803 is executed after that in step S306.

In step S803 that follows step S306, the walking angle calculation section 15 acquires angle $\theta_b$ that indicates a direction opposite to acceleration component Axy, i.e., the travel direction of walking motion by reversing angle $\theta_r$ calculated by the process in step S306 by 180° by the angle converter 15-1. This process is the same as that in step S307 in FIG. 11. However, in the process in step S803, the acquired angle is expressed by $\theta_b$ unlike in the process in step S307.

In step S804, the walking angle calculation section 15 substitutes the absolute value of acceleration component Axy determined to be a maximal peak by the process in step S303 in variable Axyb.

The walking angle calculation section 15 checks in step S805 if the value of variable Axya is equal to or larger than that of variable Axyb. If "Yes" in step S805, the walking angle data management section 16 executes a walking angle registration process as a process for registering angle $\theta_a$ mentioned above in the walking angle data file 17 in step S806. On the other hand, if "No" is determined in the process in step S805, the walking angle data management section 16 executes a walking angle registration process as a process for registering angle $\theta_b$ mentioned above in the walking angle data file 17 in step S807. The walking angle registration processes to be executed in steps S806 and S807 are substantially the same as that shown in FIG. 12, except that data to be registered in the walking angle data file 17 are angles $\theta_a$ and $\theta_b$.

In the process in step S805, the walking angle calculation section 15 checks which of the maximal peaks of acceleration component Axy in the deceleration and acceleration directions is clear by comparing the values of variables Axya and Axyb. Then, the walking angle registration process as the process in step S806 or S807, which is selectively executed in accordance with the checking result of the section 15, registers the angle calculated for the acceleration whose peak is determined to be clear in the walking angle data file 17 as a walking angle with higher reliability.

Upon completion of the process in step S806 or S807, the walking angle calculation process ends, and the flow advances to the process in step S117 shown in FIG. 9.

The walking angle calculation process according to the third embodiment of the present invention has been described.

Note that the walking angle output section 18 can execute the same process as the walking angle determination process shown in FIG. 13.

When the walking direction calculation unit 10 executes the processes shown in FIGS. 9 and 17, FIGS. 10 and 12, and FIG. 13 described above, the calculation process of the travel direction of walking motion based on the X-, Y-, and Z-acceleration component detection values according to the third embodiment of the present invention is implemented.

Note that a control program for making the aforementioned computer with the standard configuration execute various processes shown in FIGS. 9 to 13 and FIGS. 15 to 17 may be prepared, and may be loaded and executed by the computer, thus allowing the computer to execute the functions of the walking direction calculation unit 10 of the navigation apparatus 1 according to the first, second, or third embodiment. Such a control program may be recorded on a recording medium that is readable by the aforementioned computer, and may be read out from the recording medium and executed by the computer, thus also allowing the computer to execute the functions of the walking direction calculation unit 10 of the navigation apparatus 1 according to the first, second, or third embodiment.

Figure 18:
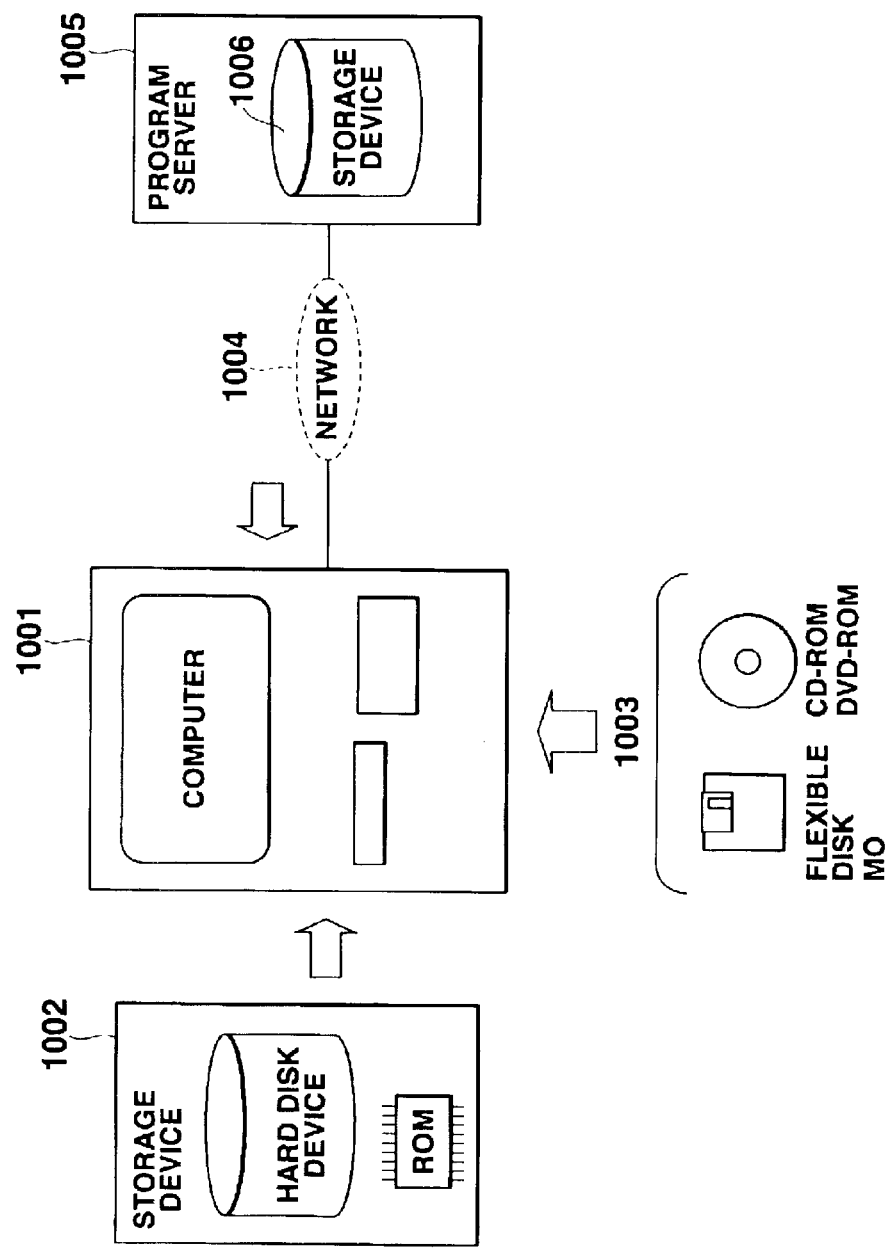
FIG. 18 shows an example of a recording medium which allows a computer to read a recorded control program.

FIG. 18 shows an example of a recording medium that allows the computer to read the recorded control program. As shown in FIG. 18, for example, a storage device 1002, portable recording medium 1003, and the like are used as the recording medium. The storage device 1002 is incorporated internally in a computer 1001 or as a device externally attached to the computer 1001. The storage device 1002 comprises, e.g., a ROM, hard disk drive, or the like. The portable recording medium 1003 comprises a portable recording medium such as an MO (magnetic optical disk), CD-ROM, DVD-ROM, flexible disk, or the like. In place of the portable recording medium 1003, a storage device 1006 may be used. The storage device 1006 is incorporated in a computer which serves as a program server 1005. The program server 1005 is connected to the computer 1001 via a network 1004. In this case, a transmission signal obtained by modulating a carrier wave by a data signal which expresses a control program is transmitted from the program server 1005 to the computer 1001 via the network 1004. The computer 1001 demodulates the received transmission signal to reproduce the control program, thus executing the control program.

Additional advantages and modifications will readily occur to those skilled in the art. Therefore, the present invention in its broader aspects is not limited to the specific details, representative device, and illustrated examples shown and described herein. Accordingly, various modifications may be made without departing from the spirit or scope of the general inventive concept as defined by the appended claims and their equivalents. For example, since values which do not make much difference are often set as constants "K2" and "K3" used in the third embodiment, these constants may be in common. In this way, the number of constants which must be prepared in advance to execute the process shown in FIG. 15 can be reduced.

What is claimed is:

1. A moving direction detection method for detecting a moving direction of a movable body, comprising:

an acceleration component acquisition step of acquiring information of an acceleration component in a vertical direction, and an acceleration component in a horizontal direction in association with an acceleration of the movable body, which is produced upon motion of the movable body;

a vertical acceleration extreme detection step of detecting a maximal value where a change over time in absolute value of the acceleration component in the vertical direction, acquired in the acceleration component acquisition step, turns from up to down, and a minimal value where a change over time in absolute value of the acceleration component in the vertical direction turns from down to up;

a horizontal acceleration extreme detection step of detecting a maximal value where a change in absolute value of the acceleration component in the horizontal direction turns from up to down within a time period between detection times of the maximal and minimal values of the absolute value of the acceleration component in the vertical direction in the vertical direction extreme detection step;

a horizontal acceleration direction detection step of detecting a direction of the acceleration component in the horizontal direction at a detection time of the maximal value of the absolute value of the acceleration component detected in the horizontal direction in the horizontal acceleration extreme detection step; and a moving direction detection step of detecting a moving direction of the movable body based on the direction of the acceleration component in the horizontal direction detected in the horizontal acceleration direction detection step.

2. A method according to claim 1, wherein the horizontal acceleration extreme detection step includes a step of detecting the maximal value of the absolute value of the acceleration component in the horizontal direction in a time interval between a detection time of the maximal value of the absolute value of the acceleration component in the vertical direction detected in the vertical acceleration extreme detection step, and a time of the minimal value of the absolute value of the acceleration component in the vertical direction as a time after the detection time of the maximal value, and the moving direction detection step includes a step of detecting the moving direction of the movable body based on a direction which is opposite to the direction of the acceleration component in the horizontal direction, which is detected in the horizontal acceleration direction detection step.

3. A method according to claim 2, wherein the horizontal acceleration extreme detection step includes a step of detecting the maximal value of the absolute value of the acceleration component in the horizontal direction in a time interval between a predetermined time after the detection time of the maximal portion of the absolute value of the acceleration component in the vertical direction detected in the vertical acceleration extreme detection step, and the time of the minimal portion of the absolute value of the acceleration component in the vertical direction.

4. A method according to claim 1, wherein the horizontal acceleration extreme detection step includes a step of detecting the maximal value of the absolute value of the acceleration component in the horizontal direction in a time interval between a time of the maximal value of the absolute value of the acceleration component in the vertical direction detected in the vertical acceleration extreme detection step, and a time of the minimal value of the absolute value of the acceleration component in the vertical direction as a time before the detection time of the maximal value, and the moving direction detection step includes a step of detecting the moving direction of the movable body based on the direction of the acceleration component in the horizontal direction, which is detected in the horizontal acceleration direction detection step.

5. A method according to claim 4, wherein the horizontal acceleration extreme detection step includes a step of detecting the maximal value of the absolute value of the acceleration component in the horizontal direction in a time interval between a predetermined time before the detection time of the maximal portion of the absolute value of the acceleration component in the vertical direction detected in the vertical acceleration extreme detection step, and the time of the minimal portion of the absolute value of the acceleration component in the vertical direction.

6. A method according to claim 1, wherein the vertical acceleration extreme detection step includes a step of detecting the maximal and minimal values in accordance with a smoothing differential method, and the horizontal acceleration extreme detection step includes a step of detecting the maximal value in accordance with the smoothing differential method.

7. A method according to claim 1, wherein the moving direction detection step includes steps of:

detecting the direction of the acceleration component in the horizontal direction detected in the horizontal acceleration direction detection step a plurality of number of times in accordance with a predetermined time intervals; and detecting the moving direction of the movable body based on the plurality of directions detected in the moving direction detection step.

8. A method according to claim 1, wherein the horizontal acceleration extreme detection step includes a step of detecting a first maximal value of the acceleration component in the horizontal direction in a time interval between a time of the maximal value of the absolute value of the acceleration component in the vertical direction, detected in the vertical acceleration extreme detection step, and a time of the minimal value of the absolute value of the acceleration component in the vertical direction as a time before the detection time of the maximal value, and a second maximal value of the acceleration component in the horizontal direction in the time interval between the time of the maximal value of the absolute value of the acceleration component in the vertical direction, detected in the vertical acceleration extreme detection step, and a time of the minimal value of the absolute value of the acceleration component in the vertical direction as a time after the detection time of the maximal value, the method further comprises a comparison step of comparing absolute values of the first and second maximal values of the acceleration component in the horizontal direction detected in the horizontal acceleration extreme detection step, and wherein the moving direction detection step includes the step of detecting, when it is determined in the comparison step that the absolute value of the first maximal value is larger than the absolute value of the second maximal value, the moving direction of the movable body based on the direction of the acceleration component in the horizontal direction detected in the horizontal acceleration direction detection step, and of detecting, when it is determined in the comparison step that the absolute value of the second maximal value is larger than the absolute value of the first maximal value, the moving direction of the movable body based on a direction exactly opposite to the direction of the acceleration component in the horizontal direction detected in the horizontal acceleration direction detection step.

9. A method according to claim 1, wherein the moving direction detection step includes a step of detecting a direction based on a meridian, and detecting the moving direction of the movable body based on detected direction, and the direction of the acceleration component in the horizontal direction, detected in the horizontal acceleration direction detection step.

10. A moving direction detection apparatus which can be carried by a movable body, and comprises:

an acceleration detection unit which detects a acceleration component of the moving direction detection apparatus;

a first correction unit which corrects a carrying direction of the moving direction detection apparatus with respect to the vertical direction based on the direction of the acceleration component detected by the acceleration detection unit;

a second correction unit which corrects the carrying direction of the moving direction detection apparatus with respect to the horizontal direction based on a periodic up/down pattern of an acceleration component of the moving direction detection apparatus which is detected by the acceleration detection unit; and a moving direction detection unit which detects a moving direction of the movable body in accordance with correction results of the first and second correction units.

11. An apparatus according to claim 10, wherein the second correction unit detects a maximal value where a change over time in absolute value of the acceleration component in the horizontal direction, detects a direction of the acceleration component in the horizontal direction at a detection time of the maximal value, and corrects the carrying direction of the moving direction detection apparatus with respect to the horizontal direction of the apparatus with reference to the detected direction.

12. An apparatus according to claim 11, wherein the second correction unit detects the maximal value of the absolute value of the acceleration component in the horizontal direction at a specific timing on the periodic up/down pattern of the absolute value of the acceleration component in the vertical direction in association with the acceleration of the movable body.

13. An apparatus according to claim 12, wherein the acceleration detection unit acquires acceleration components in the vertical direction of the movable body at a predetermined time intervals, the apparatus further comprises a storage unit which stores data of times corresponding to the predetermined time intervals, and data of acceleration components in the vertical direction corresponding to the data of times, and the second correction unit stores the data of acceleration components acquired by the acceleration detection unit in correspondence with the data of times corresponding to the predetermined time intervals, which are stored in the storage unit, and detects the maximal value of the acceleration component in the vertical direction by comparing an absolute value of an acceleration component in the horizontal direction, which is stored in the storage unit in correspondence with a predetermined time, with an absolute value of an acceleration component in the vertical direction, which is stored in correspondence with a time before or after the predetermined time.

14. An apparatus according to claim 10, further comprising:

an apparatus direction detection unit for detecting the direction of the apparatus with reference to a meridian, and wherein the moving direction detection unit detects, as the moving direction of the movable body, a direction obtained by correcting the direction detected by the apparatus direction detection unit using the first and second correction units.

15. A medium having program code and data code which is readable by a computer, including:

program code of acquiring an acceleration component in a vertical direction, and an acceleration component in a horizontal direction perpendicular to the vertical direction, in association with an acceleration produced upon motion of a movable body;

program code of detecting a maximal value where a change over time in acceleration component in the vertical direction turns from up to down, and a minimal value where the change over time in acceleration component in the vertical direction turns from down to up;

program code of detecting a maximal value where a change over time in acceleration component in the horizontal direction turns from up to down in a time interval between detection times of the maximal and minimal values of the acceleration component in the vertical direction;

program code of detecting a direction of the acceleration component in the horizontal direction at a detection time of the maximal value of the acceleration component in the horizontal direction; and program code of determining a direction specified in correspondence with the direction of the acceleration component in the horizontal direction as a detection result of a moving direction of the movable body.

* * * * *